United States Patent
Rosati et al.

(10) Patent No.: US 9,940,594 B1
(45) Date of Patent: Apr. 10, 2018

(54) DIGITAL WORKROOM

(71) Applicant: Elance, Inc., Mountain View, CA (US)

(72) Inventors: Fabio Rosati, Palo Alto, CA (US);
Yuet Ping Poon, Cupertino, CA (US);
Rajasekhar L. Kovuru, Sunnyvale, CA (US); Ved Ranjan Sinha, Menlo Park, CA (US); Ayyappan Arasu, Cupertino, CA (US); Maurizio A. Gianola, Palo Alto, CA (US); Anthony M. Hahn, San Jose, CA (US)

(73) Assignee: ELANCE, INC., Mountain View, CA (US)

( * ) Notice: Subject to any disclaimer, the term of this patent is extended or adjusted under 35 U.S.C. 154(b) by 0 days.

(21) Appl. No.: 13/962,714

(22) Filed: Aug. 8, 2013

Related U.S. Application Data

(62) Division of application No. 12/709,214, filed on Feb. 19, 2010, now abandoned.

(51) Int. Cl.
*G06Q 10/06* (2012.01)
(52) U.S. Cl.
CPC .......................... *G06Q 10/063114* (2013.01)
(58) Field of Classification Search
CPC ............................................. G06Q 10/063114
See application file for complete search history.

(56) References Cited

U.S. PATENT DOCUMENTS

| | | |
|---|---|---|
| 4,703,325 A | 10/1987 | Chamberlin et al. |
| 4,799,156 A | 1/1989 | Shavit et al. |
| 5,008,853 A | 4/1991 | Bly et al. |
| 5,220,657 A | 6/1993 | Bly et al. |
| 5,548,506 A | 8/1996 | Srinivasan |
| 5,557,515 A | 9/1996 | Abbruzzese et al. |

(Continued)

FOREIGN PATENT DOCUMENTS

| | | |
|---|---|---|
| EP | 0952536 A1 | 10/1999 |
| WO | 0173645 A1 | 10/2001 |

OTHER PUBLICATIONS

Costin, Aaron et al, "Leveraging passive RFID technology for construction resource field mobility and status monitoring in a high-rise renovation project," Mar. 11, 2012, Automation in Construction, vol. 24, pp. 1-15 (Year: 2012).*

(Continued)

*Primary Examiner* — Thomas L Mansfield
*Assistant Examiner* — Amanda K Gurski
(74) *Attorney, Agent, or Firm* — Haverstock & Owens LLP

(57) ABSTRACT

A workroom is automatically established for each job created and is associated with a unique email address. The workroom allows members to hold live meetings, communicate in real-time, including via email, upload/manage/share files, and automatically provide transcripts of communication. The workroom also allows team members to launch work trackers directly from the workroom. A work tracker collects work information and directly generates one or more status reports based on the work information collected. A status report includes a back-end version viewable and modifiable by a service provider and a front-end version viewable by a buyer. The status report directly generates an invoice based on the information from the status report. The invoice is submitted to the buyer and allows the buyer to directly pay the service provider.

17 Claims, 15 Drawing Sheets

(56) References Cited

U.S. PATENT DOCUMENTS

| | | |
|---|---|---|
| 5,592,620 A | 1/1997 | Chen et al. |
| 5,664,115 A | 9/1997 | Fraiser |
| 5,715,402 A | 2/1998 | Popolo |
| 5,732,400 A | 3/1998 | Mandler et al. |
| 5,794,207 A | 8/1998 | Walker et al. |
| 5,835,896 A | 11/1998 | Fisher et al. |
| 5,842,178 A | 11/1998 | Giovannoli |
| 5,862,223 A | 1/1999 | Walker et al. |
| 5,905,975 A | 5/1999 | Ausubel |
| 5,924,082 A | 7/1999 | Silverman et al. |
| 5,949,976 A | 9/1999 | Chappelle |
| 5,956,715 A | 9/1999 | Glasser et al. |
| 5,966,130 A | 10/1999 | Benman, Jr. |
| 6,009,154 A | 12/1999 | Ricken et al. |
| 6,041,307 A | 3/2000 | Ahuja et al. |
| 6,049,777 A | 4/2000 | Sheena et al. |
| 6,061,665 A | 5/2000 | Bahreman |
| 6,064,980 A | 5/2000 | Jacobi et al. |
| 6,078,906 A | 6/2000 | Huberman |
| 6,092,049 A | 7/2000 | Chislenko et al. |
| 6,101,482 A | 8/2000 | DiAngelo et al. |
| 6,119,101 A | 9/2000 | Peckover |
| 6,119,149 A | 9/2000 | Notani |
| 6,128,624 A | 10/2000 | Papierniak et al. |
| 6,141,653 A | 10/2000 | Conklin et al. |
| 6,154,731 A | 11/2000 | Monks et al. |
| 6,161,099 A | 12/2000 | Harrington et al. |
| 6,208,659 B1 | 3/2001 | Govindarajan et al. |
| 6,223,177 B1 | 4/2001 | Tatham et al. |
| 6,226,031 B1 | 5/2001 | Barraclough et al. |
| 6,233,600 B1 | 5/2001 | Salas et al. |
| 6,292,792 B1 | 9/2001 | Baffes et al. |
| 6,311,178 B1 | 10/2001 | Bi et al. |
| 6,336,105 B1 | 1/2002 | Conlin et al. |
| 6,374,292 B1 | 4/2002 | Srivastava et al. |
| 6,385,620 B1 | 5/2002 | Kurzius et al. |
| 6,415,270 B1 | 7/2002 | Rackson et al. |
| 6,442,528 B1 | 8/2002 | Notani et al. |
| 6,484,153 B1 | 11/2002 | Walker et al. |
| 6,557,035 B1 | 4/2003 | McKnight |
| 6,564,246 B1 | 5/2003 | Varma et al. |
| 6,567,784 B2 | 5/2003 | Bukow |
| 6,591,011 B1 | 7/2003 | Nielsen |
| 6,598,026 B1 | 7/2003 | Ojha et al. |
| 6,662,194 B1 | 12/2003 | Joao |
| 6,735,570 B1 | 5/2004 | Lacy et al. |
| 6,832,176 B2 | 12/2004 | Hartigan et al. |
| 6,859,523 B1 | 2/2005 | Jilk et al. |
| 6,871,181 B2 | 3/2005 | Kansal |
| 6,931,385 B1 | 8/2005 | Halstead et al. |
| 6,938,048 B1 | 8/2005 | Jilk et al. |
| 7,069,242 B1 | 6/2006 | Sheth et al. |
| 7,096,193 B1 | 8/2006 | Beaudoin et al. |
| 7,155,400 B1 | 12/2006 | Jilk et al. |
| 7,310,415 B1 | 12/2007 | Short |
| 7,406,443 B1 | 7/2008 | Fink et al. |
| 7,437,327 B2 | 10/2008 | Lam et al. |
| 7,444,374 B1 | 10/2008 | Baker |
| 7,466,810 B1 | 12/2008 | Quon et al. |
| 7,505,919 B2 | 3/2009 | Richardson |
| 7,587,336 B1 | 9/2009 | Wallgreen et al. |
| 7,752,080 B1 | 7/2010 | Greener |
| 8,024,225 B1 | 9/2011 | Sirota et al. |
| 8,224,755 B2 | 7/2012 | Goodman |
| 8,380,709 B1 | 2/2013 | Diller et al. |
| 8,512,143 B2 | 8/2013 | Jung et al. |
| 8,856,670 B1 | 10/2014 | Thakur et al. |
| 2001/0011222 A1 | 8/2001 | McLauchlin et al. |
| 2001/0034630 A1 | 10/2001 | Mayer et al. |
| 2001/0034688 A1 | 10/2001 | Annunziata |
| 2001/0041988 A1 | 11/2001 | Lin |
| 2002/0010685 A1 | 1/2002 | Ashby |
| 2002/0023046 A1 | 2/2002 | Callahan et al. |
| 2002/0032576 A1 | 3/2002 | Abbot et al. |
| 2002/0054138 A1 | 5/2002 | Hennum |
| 2002/0120522 A1 | 8/2002 | Yang |
| 2002/0120554 A1 | 8/2002 | Vega |
| 2002/0129139 A1 | 9/2002 | Ramesh |
| 2002/0133365 A1 | 9/2002 | Grey et al. |
| 2002/0161707 A1 | 10/2002 | Cole et al. |
| 2002/0194077 A1 | 12/2002 | Dutta |
| 2003/0014294 A1 | 1/2003 | Yoneyama et al. |
| 2003/0046155 A1 | 3/2003 | Himmel et al. |
| 2003/0055780 A1 | 3/2003 | Hansen et al. |
| 2003/0086608 A1 | 5/2003 | Frost et al. |
| 2003/0097305 A1 | 5/2003 | Ogino et al. |
| 2003/0101126 A1 | 5/2003 | Cheung et al. |
| 2003/0120603 A1 | 6/2003 | Kojima et al. |
| 2003/0191684 A1 | 10/2003 | Lumsden et al. |
| 2003/0212627 A1 | 11/2003 | Burns et al. |
| 2003/0220843 A1 | 11/2003 | Lam et al. |
| 2004/0063463 A1 | 4/2004 | Boivin |
| 2004/0064436 A1* | 4/2004 | Breslin ................ G06Q 10/06 |
| 2004/0103167 A1 | 5/2004 | Grooters et al. |
| 2004/0122926 A1 | 6/2004 | Moore et al. |
| 2004/0128224 A1 | 7/2004 | Dabney et al. |
| 2004/0215560 A1 | 10/2004 | Amalraj et al. |
| 2004/0230511 A1 | 11/2004 | Kannan et al. |
| 2005/0027654 A1* | 2/2005 | Adrian ........................ 705/40 |
| 2005/0043998 A1 | 2/2005 | Bross et al. |
| 2005/0131830 A1 | 6/2005 | Juarez et al. |
| 2005/0222907 A1 | 10/2005 | Pupo |
| 2006/0031177 A1 | 2/2006 | Rule |
| 2006/0122850 A1 | 6/2006 | Ward et al. |
| 2006/0136324 A1 | 6/2006 | Barry et al. |
| 2006/0155609 A1 | 7/2006 | Caiafa |
| 2006/0195428 A1 | 8/2006 | Peckover |
| 2006/0212359 A1 | 9/2006 | Hudgeon |
| 2007/0005536 A1 | 1/2007 | Caswell et al. |
| 2007/0022040 A1 | 1/2007 | Gordon |
| 2007/0027746 A1 | 2/2007 | Grabowich |
| 2007/0027792 A1 | 2/2007 | Smith |
| 2007/0061144 A1 | 3/2007 | Grichnik et al. |
| 2007/0067196 A1* | 3/2007 | Usui ...................... G06Q 10/06 705/7.12 |
| 2007/0078699 A1 | 4/2007 | Scott et al. |
| 2007/0112671 A1 | 5/2007 | Rowan |
| 2007/0130059 A1 | 6/2007 | Lee et al. |
| 2007/0162379 A1 | 7/2007 | Skinner |
| 2007/0174180 A1 | 7/2007 | Shin |
| 2007/0174394 A1 | 7/2007 | Jayaweera |
| 2007/0192130 A1 | 8/2007 | Sandhu |
| 2007/0233510 A1 | 10/2007 | Howes |
| 2008/0010598 A1 | 1/2008 | Smilowitz et al. |
| 2008/0059523 A1 | 3/2008 | Schmidt et al. |
| 2008/0065444 A1 | 3/2008 | Stroman et al. |
| 2008/0082662 A1 | 4/2008 | Dandiker et al. |
| 2008/0104495 A1 | 5/2008 | Craig |
| 2008/0109491 A1 | 5/2008 | Gupta |
| 2008/0134292 A1 | 6/2008 | Ariel et al. |
| 2008/0154783 A1 | 6/2008 | Rule et al. |
| 2008/0184135 A1 | 7/2008 | Washburn et al. |
| 2008/0187114 A1 | 8/2008 | Altberg et al. |
| 2008/0194228 A1 | 8/2008 | Pousti et al. |
| 2008/0288582 A1 | 11/2008 | Pousti et al. |
| 2008/0294631 A1 | 11/2008 | Malhas et al. |
| 2008/0313005 A1 | 12/2008 | Nessland et al. |
| 2009/0011395 A1 | 1/2009 | Schmidt et al. |
| 2009/0017788 A1 | 1/2009 | Doyle et al. |
| 2009/0048895 A1* | 2/2009 | Hickey ................ G06Q 10/025 705/7.37 |
| 2009/0055404 A1 | 2/2009 | Heiden et al. |
| 2009/0112728 A1* | 4/2009 | Evers ................... G06Q 10/087 705/26.1 |
| 2009/0055476 A1 | 5/2009 | Callanan et al. |
| 2009/0132345 A1 | 5/2009 | Meyssami et al. |
| 2009/0150386 A1 | 6/2009 | Lichtblau |
| 2009/0177691 A1 | 7/2009 | Manfredi et al. |
| 2009/0210282 A1 | 8/2009 | Elenbaas et al. |
| 2009/0234706 A1 | 9/2009 | Adams et al. |
| 2009/0241035 A1 | 9/2009 | Tseng et al. |
| 2009/0241172 A1 | 9/2009 | Sennett et al. |
| 2009/0287592 A1 | 11/2009 | Brooks et al. |
| 2009/0288021 A1 | 11/2009 | Ioffe et al. |

(56) References Cited

U.S. PATENT DOCUMENTS

| | | | |
|---|---|---|---|
| 2009/0327081 | A1 | 12/2009 | Wang et al. |
| 2010/0017253 | A1 | 1/2010 | Butler et al. |
| 2010/0088749 | A1 | 4/2010 | Steeples |
| 2010/0115040 | A1 | 5/2010 | Sargent et al. |
| 2010/0144318 | A1 | 6/2010 | Cable |
| 2010/0162167 | A1 | 6/2010 | Stallings et al. |
| 2010/0191591 | A1 | 7/2010 | Silbert |
| 2010/0287525 | A1 | 11/2010 | Wagner |
| 2011/0106762 | A1 | 5/2011 | Dane et al. |
| 2011/0107088 | A1 | 5/2011 | Eng et al. |
| 2011/0238505 | A1 | 9/2011 | Chiang et al. |
| 2011/0238768 | A1 | 9/2011 | Habets et al. |
| 2013/0325734 | A1 | 12/2013 | Bixler et al. |
| 2014/0164271 | A1 | 6/2014 | Forman et al. |

OTHER PUBLICATIONS ants.com web pages [online]. Ants.com [retrieved on Aug. 22, 2008]. Retrieved from the Internet: <URL: http://www.ants.com/ants/>.

bizbuyer.com web pages [online]. BizBuyer.com, Inc. [retrieved Aug. 18-21, 2000]. Retrieved from the Internet: <URL: http://www.bizbuyer.com/>.

BullhornPro web pages [online]. Bullhorn, Inc. [retrieved on Jan. 4, 2001]. Retrieved from the Internet: <URL: http://www.bullhornpro.com/>.

Cassidy, M., "Going for Broke," San Jose Mercury News, Monday, Aug. 16, 1999, pp. 1E and 4E, published in San Jose, CA.

efrenzy.com web pages [online]. eFrenzy, Inc. [retrieved on Aug. 22, 2000]. Retrieved from the Internet: <URL: http://www.efrenzy.com/index.isp>.

Eisenberg, D., "We're for Hire, Just Click," Time Magazine, Aug. 16, 1999, vol. 154, No. 7 [online] [retrieved on Aug. 19, 1999]. Retrieved from the Internet: <URL: http://www.pathfinder.com/time/magazine/articles/0,3266,29393,00.html>.

eworkexchange.com web pages [online]. eWork Exchange, Inc. [retrieved on Aug. 18-22, 2000]. Retrieved from the Internet: <URL: http://www.eworks.com/>.

eWork Exchange web pages [online]. eWork Exchange, Inc. [retrieved on Jan. 5, 2001]. Retrieved from the Internet: <URL: http://www.eworks.com/>.

eWork ProSource web pages [online]. eWork Exchange, Inc. [retrieved on Jan. 3, 2001]. Retrieved from the Internet: <URL: http://www.ework.com/>.

FeeBid.com web pages [online]. FeeBid.com [retrieved on Dec. 18, 2000]. Retrieved from the Internet: <URL: http://www.feebid.com>.

freeagent.com web pages [online]. FreeAgent.corn [retrieved Aug. 18-22, 2000]. Retrieved from the Internet: <URL: http://www.freeagent.com/>.

guru.com.com web pages [online]. Guru.com, Inc. [retrieved Aug. 18, 2000]. Retrieved from the Internet: <URL: http://www.guru.com/>.

Herhold, S., "Expert Advice is Collectible for Start-up," San Jose Mercury News, Monday, Aug. 16, 1999, pp. 1E and 6E, San Jose, CA.

hotdispatch.com web pages [online]. HotDispatch, Inc. [retrieved on Aug. 22, 2000]. Retrieved from the Internet: <URL: http://www.hotdispatch.com/>.

Humphreys, Paul et al., "A Just-in-Time Evaluation Strategy for International Procurement," MCB UP Limited, 1998, pp. 1-11.

"IBNL Forges Into the Future of Buying and Selling with Source Interactive Software," PR Newswire, Jan. 10, 1996. [replacement copy retrieved on May 4, 2009]. Retrieved from Internet: <URL: http://www.highbeam.com>.

imandi.com web pages [online]. Imandi Corporation [retrieved on Aug. 22, 2000]. Retrieved from the Internet: <URL: http://www.imandi.com/>.

Malone, Thomas W. et al., "The Dawn of the E-Lance Economy," Harvard Business Review, Sep.-Oct. 1998, pp. 145-152.

"Netscape Selects Netopia as the Exclusive 'Virtual Office' Offering on the New Netscape Small Business Source Service," PR Newswire, May 11, 1998, Mountain View and Alameda, California.

onvia.com web pages [online]. Onvia.com [retrieved Aug. 22, 2000]. Retrieved from the Internet: <URL: http://www.onvia.com/usa/home/index.cfm>.

Opus360 web pages [online]. Opus360 Corporation [retrieved on Jan. 3, 2001] Retrieved from the Internet: <URL: http://www.opus360com/>.

smarterwork.com web pges [online]. smarterwork.com, Inc. [retrieved on Aug. 22, 2000]. Retrieved from the Internet: <URL: http://www.smarterwork.com/>.

workexchange.com web pages [online]. WorkExchange, Inc. [retrieved Aug. 22, 2000]. Retrieved from the Internet: <URL: http://www.workexchange.com/unique/workexchange/index1.cfm>.

Shalil Majithia et al, "Reputation-based Semantic Service Discovery", Department of Computer Science, Cardiff University, UK, 13th IEEE International Workshops on Enabling Technologies: Infrastructure for Collaborative Enterprises (WET ICE '04) pp. 1-6.

Ziqiang Xu et al., "Reputation-Enhanced QoS-based Web Services Discovery", School of Computing, Queen's University, Jul. 2007, pp. 1-8.

Davenport, Thomas H. and Keri Pearlson, "Two Cheers for the Virtual Office," Summer 1998, abstract, retrieved from the Internet: <URL: http://www.pubservice.com/MSStore?ProductDetails.aspx?CPC=3944>.

Massimo Paolucci et al. "Semantic Matching of Web Services Capabilities" Carnegie Mellon University, 2002, Springer-Verlag Berlin Heidelberg, p. 333-347.

morebusiness.com, "How to Write Winning Business Proposals: Writing Strategies," cited in Office Action dated Oct. 6, 2011, <http://www.morebusiness.com/running_your_business/management/v1n11.brc>, published Aug. 1, 1998.

Madbid.com [online] <URL: http://web.archive.org.web/20080829025830//http://uk.nadbid.com/faq/>.

PCT International Search Report and Written Opinion, PCT/US06/22734, dated Jun. 3, 2008, 5 pages.

Office Action dated Jan. 13, 2014, U.S. Appl. No. 13/962,771, filed Aug. 8, 2013, Fabio Rosati et al.

Office Action dated Nov. 22, 2013, U.S. Appl. No. 13/962,795, filed Aug. 8, 2013, Fabio Rosati et al.

Office Action dated Apr. 23, 2014, U.S. Appl. No. 12/709,214, filed Feb. 19, 2010, Fabio Rosati, 21 pages.

University of Wisconsin—Eau Claire LTS Online Help Documentation, Microsoft Excel 2003/2004, using the Sort Command, https://web.archive.org/web/20080311184836/http://www.uwec.edu/Help/Excel03/srtcom.htm,Mar. 11, 2008,retrieved Oct. 1, 2014.

Office Action from the U.S. Appl. No. 11/450,875, filed Jun. 12, 2006, First Named Inventor: Odysseas Tsatalos, dated Jul. 28, 2015, pp. 20.

Final Office Action dated Sep. 8, 2015, U.S. Appl. No. 13/962,795, filed Aug. 8, 2013, Fabio Rosati et al., 51 pages.

Office Action dated Mar. 10, 2016, U.S. Appl. No. 13/962,795, filed Aug. 8, 2013, Fabio Rosati et al., 43 pages.

Final Office Action dated Jul. 21, 2016, U.S. Appl. No. 13/962,795, filed Aug. 8, 2013, Fabio Rosati et al., 32 pages.

\* cited by examiner

Work Tracker | Elance - Mozilla Firefox 〰 200

Web/Application GUI Design [Select]

Apply to
Website Design

| Logged | Budgeted | Date | Time Started |
|---|---|---|---|
| 23 hrs | 160 hrs | 12-28-08 | 08:32:56 am EST |

00H : 00M : 00S  [START]  [STOP]  [RESET]

[0] [Select a Function ▸]  [increment by 1]  [decrement by 1]

Text / Journal

[⎯⎯⎯⎯⎯⎯⎯⎯⎯⎯ 305

Monday 12-22-08
  Created five sample web user interface designs, sent to client; 4 hour; .....
Tuesday 12-23-08
  based on client approved interface design, created 4 color schemes for web user interface; 8 hours; .....
Wednesday 12-24-08
  based on approved color scheme, created a variety of buttons and menu designs; 5 hours; .....
Thursday 12-25-08
  <none logged>
Friday 12-26-08
  client approved buttons and menu designs. Code approved web interface design; 6 hours; .....
Saturday 12-27-08
  Code approved web interface design; 4 hours; .....
Sunday 12-28-08  ◂ 325

[Browse] [Attach]

C:\...file2.jpg
1. file1.jpg

[Submit] [Discard] [View Log]  [Close] [Print] [Save]
                                  310    315    320

Done

Fig. 3A

Status Report | Elance - Mozilla Firefox

File  Edit  View  History  Bookmarks  Tools  Help

Back  |  Address  http://www.elance.com/p?q=  |  Go

Week of December 22, 2008
Web/Application GUI Design

To: Eshaan  
    Bizlaw, LLP

From: TJ_08  
      WebExpert, Inc.

Log

Hours logged by tracker 33H:00M

|  | Mon 12-22 | Tues 12-23 | Wed 12-24 | Thurs 12-25 | Fri 12-26 | Sat 12-27 | Sun 12-28 | This Week | Project Total | Budgeted |
|---|---|---|---|---|---|---|---|---|---|---|
| Hours Worked | 4 | 8 | 5 | 7 | 6 | 4 | 6 | 40 | 40 | 120 |
| Claims Processed | 2 | 3 | 0 | 2 | 12 | 12 | 0 | 31 | 31 | |
| Calls Taken | 0 | 23 | 23 | 44 | 30 | 0 | 0 | 120 | 120 | |
| Emails Replied | 125 | 233 | 123 | 299 | 232 | 223 | 0 | 1235 | 1235 | |

Progress This Week

1. Logo Design  ▬▬▬▬▬▬▬  100% Completed   Due: 1-1-09   ⊘ On Schedule
   - Last Checked In: 12-22-08
   - Deliverables: front.jpg
   - Budgeted: 20 hours
   - Actual: 18 hours Comments: Hope you like the design!

[ Your Action Required: Review & Sign Off ]

2. Website Design  ▬▬▬▬  50% Completed   Due: 2-1-09   ⊕ Delayed to 3-1-09
   - Last Checked In: 12-28-08
   - Deliverables: file1.jpg   file2.jpg
   - Budgeted: 160 hours
   - Actual: 21 hours Comments: Will need to spend 2 weeks out of town, starting 1-1-09, because of a unexpected family emergency.

Plans For Next Week

1. Milestones & Deliverables
   - complete Logo design
   - work on company info web page 2. What will be done?
   - Final revision of Logo design, obtain sign off
   - Schedule a conference call before going out of town Received: 12/29/08 5:30pm  [CLOSE] [DISAGREE] [FORWARD] [PRINT] [SAVE]

Done

DIGITAL WORKROOM

RELATED APPLICATIONS

This patent application is a Divisional application which claims priority under 35 U.S.C. 121 of the co-pending U.S. patent application Ser. No. 12/709,214, filed Feb. 19, 2010, entitled "DIGITAL WORKROOM," which is hereby incorporated by reference in its entirety.

FIELD OF THE INVENTION

The present invention relates to workrooms. More particularly, the present invention relates to a digital workroom that enables people to work together safely and effectively online.

BACKGROUND OF THE INVENTION

A job posting site allows job seekers to post resumes and search for jobs. However, prior art job posting sites suffer from a number of shortcomings. For example, although a prior art job posting site may allow job seekers to upload documents or generate invoices to send to employers after completion of jobs, the prior art job posting site lacks tools that enable a job seeker and an employer to work together productively and efficiently. The tools include an ability for the job seeker to manage time while working on the job, an ability for the employer to assess the job seeker's progress until completion of the job, an ability for the job seeker to send the employer a bill, or the like. Even if the tools were available through the prior art job posting site, these tools are scattered throughout the site; the job seeker typically needs to find these separate tools when needed. At times, the job seeker is required to redundantly enter the same information in two or more tools. Accordingly, the job seeker wastes valuable time searching for needed tools, entering information, or both.

The present invention addresses at least these limitations in the prior art.

SUMMARY OF THE INVENTION

An object of the present invention is to provide a digital workroom within a services exchange medium. In the services exchange medium, buyers find and hire service providers "on demand" to get projects done quickly and cost effectively. Specifically, buyers post projects and service providers search for projects to work on.

In one aspect, a system to streamline online work process includes a status reporting component and a work tracking component. The status reporting component typically includes at least one status report. At least one status report directly generates/updates an invoice via a first generate mechanism associated with the at least one status report. The work tracking component typically includes at least one work tracker. At least one work tracker allows a service provider to collect work information over a period of work time to directly generate/update the at least one status report using the work information collected via a second generate mechanism associated with the at least one work tracker. Each one tracker also allows the service provider to communicate in real time with a server to transmit and receive job data posted to a workroom associated with the job. The first generate mechanism typically translates information from the at least one status report to generate the invoice, and the second generate mechanism typically translates the work information collected to generate the at least one status report.

In some embodiments, at least one status report includes work information collected by a plurality of work trackers. At least one work tracker documents work for a project and allows the service provider to track a specific milestone and/or function of the project and to enter notes and attach at least one file. The work information collected by at least one work tracker is modifiable before generating/updating the at least one status report. At least one work tracker also includes a discard mechanism configured to discard the work information collected without updating/existing the at least one status report. At least one work tracker also includes a view log mechanism configured to display days previously logged during a status report period. In some embodiments, the job data includes screen shots periodically captured by at least one work tracker and messages regarding the job. At least one status report typically includes a first version viewable and modifiable by the service provider and a second version viewable by a buyer. The second version typically includes at least one communication method configured to allow the buyer to communicate with the service provider. At least one status report in some embodiments comprises a pay mechanism to monetarily compensate one or more service providers. In some embodiments, at least one invoice includes information from a plurality of status reports. In some embodiments, the system further includes an invoicing component comprising at least one invoice. At least one invoice includes a pay mechanism allowing the buyer to pay the service provider.

In another aspect, a method implemented on a device includes automatically generating/updating at least one status report directly from a work tracker based on a first set of information. In some embodiments, the step of generating/updating step includes storing the first set of information in a database. The method further includes automatically generating/updating an invoice directly from the status report based on a second set of information. The first set of information is typically collected by the work tracker, and the second set of information is typically from the at least one status report. In some embodiments, the method further includes, before the generating step, launching the work tracker. The launching step includes selecting a job, starting a timer, choosing a milestone, and/or utilizing a function counter. In some embodiments, the method further includes, after the generating/updating step, notifying team members of the at least one status report. In some embodiments, the method further includes, after the generating/updating step, manually modifying the at least one status report.

In yet another aspect, an apparatus implemented on a device for documenting work activities of one or more jobs includes a first component and a second component. The first component is for collecting work information regarding a selected job to keep track of, wherein the first component is configured to automatically create/update at least one status report based on the work information collected. The first component provides an ability to track a specific milestone and/or a function of the selected job. The second component is for communicating in real time with a server to transmit and receive job data to and from a workroom associated with the job, wherein the job data includes automatic screen shots and messages. The second component includes at least one of an instant messaging feature, an instant video conferencing feature, and a screen shot capturing feature. The work information that is collected is modifiable prior to creating/updating the at least one status report. The work information typically includes at least notes, attached files and tracked time.

In yet another aspect, a system to facilitate online work includes a plurality of workrooms. Each workroom is automatically established upon creation of a job and is assigned a unique email address, wherein content can be sent to a workroom via the unique email address. In some embodiments, each workroom is associated with a web address. In some embodiments, content posted to a workroom cannot be removed from the workroom. Content posted to a workroom is typically forwarded to a member's personal email address or is displayed in a popup message, for example, when the member is not in the workroom. In some embodiments, each workroom has a plurality of customized views. One view allows a service provider to directly launch a work tracker and/or to directly view and modify status reports. One view allows a buyer to directly view all team members working on a project, to directly view service providers working on all projects and/or to leave feedback for one or more service providers. In some embodiments, each workroom comprises a real time meeting mode to allow for the exchange of messages and files in real time. In some embodiments, each workroom comprises a rendering feature to provide transcripts of meetings. In some embodiments, the system further includes a work tracker. The work tracker is able to send and receive data to and from one or more of the workrooms. In some embodiments, the system further includes at least one database to store the content.

In yet another aspect, a provider workroom for a job includes content, a unique email address, a chatting component, a tracker component, and a status report component. Content typically includes messages and files that are organized in tables and/or folders. In some embodiments, data sent to the unique email address becomes content. The chatting component allows real time communication; the communication also becomes content. The tracker component collects work information for the job. The status report component takes the work information collected by the tracker to create/update a status report. In some embodiments, the content is pushed to other team members as an email and/or a pop-up message.

In yet another aspect, a buyer workroom for one or more jobs includes content, a unique email address, a chatting component, a work view component, a billing component, a feedback component, and a providers component. Content typically includes messages and files, wherein the content is organized in tables and/or folders. In some embodiments, data sent to the unique email address becomes content. The chatting component allows real time communication; the communication also becomes content. The billing component allows a buyer to pay a team member. The feedback component allows the buyer to provide feedback for the team member. The work view component displays team members for a job, while the providers component display service providers for all jobs. The buyer workroom further comprises an ad-hoc feature of adding and removing a team member.

BRIEF DESCRIPTION OF THE DRAWINGS

FIGS. 2-3B illustrate an exemplary work tracker in accordance with the present invention.

FIG. 4 illustrates an exemplary status report as received and viewed by a buyer in accordance with the present invention.

FIGS. 6A-6C illustrate exemplary views of a workroom in accordance with the present invention

DETAILED DESCRIPTION OF THE INVENTION

Figure 1:
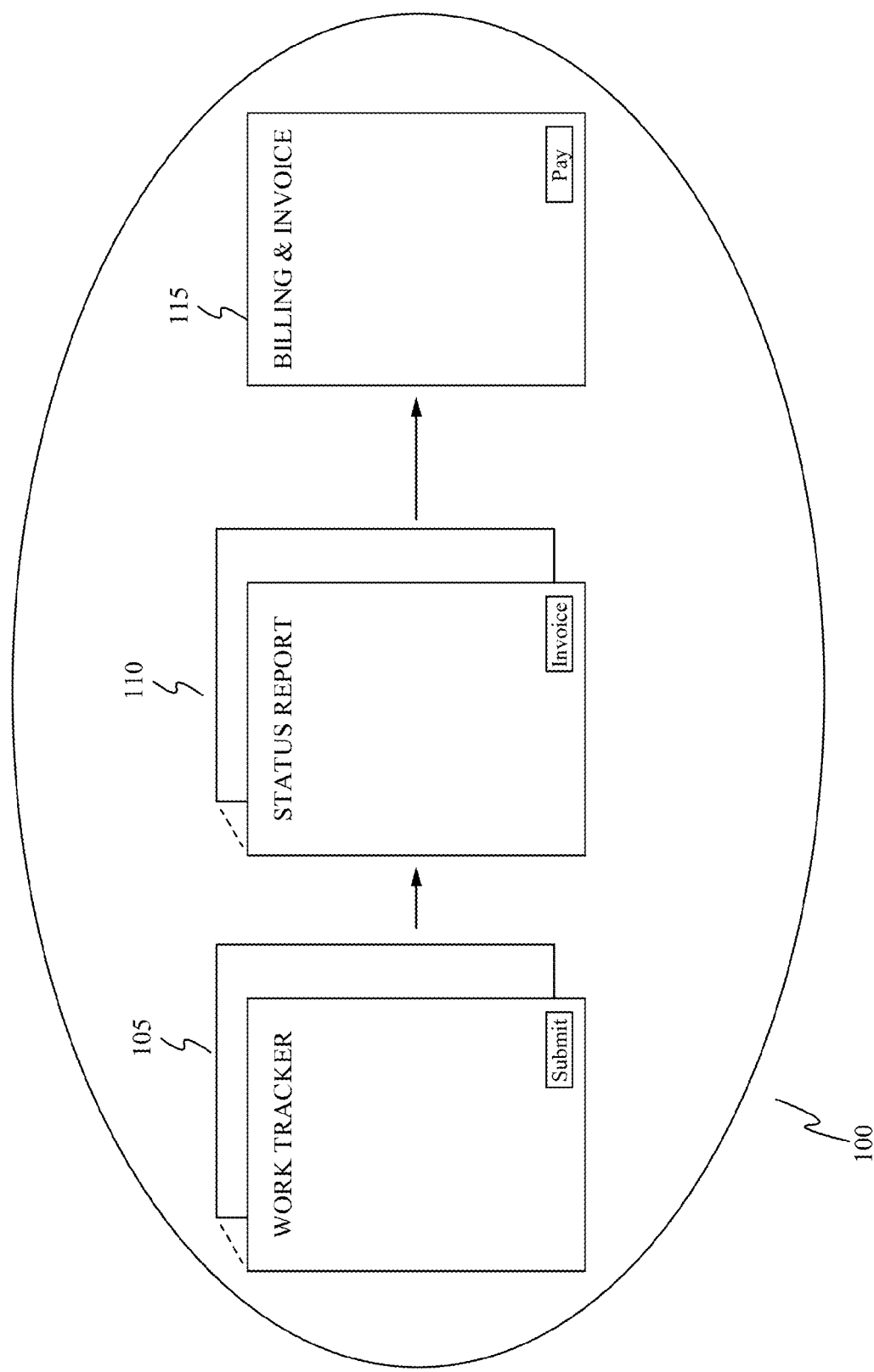
FIG. 1 illustrates an exemplary system of a work tracking component, a status reporting component, and a invoicing component in accordance with the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein or with equivalent alternatives.

In a preferred embodiment, the steps of the present invention are embodied in machine-executable instructions. These instructions can be used to cause a general-purpose or special-purpose processor that is programmed with the instructions to perform the steps of the present invention. Alternatively, the steps of the present invention can be performed by specific hardware components that contain hardwired logic for performing the steps, or by any combination of programmed computer components and custom hardware components.

Reference will now be made in detail to implementations of the present invention as illustrated in the accompanying drawings. The same reference indicators will be used throughout the drawings and the following detailed description to refer to the same or like parts.

Embodiments of the present invention are directed a digital workroom within a services exchange medium. Preferably, in the services exchange medium, buyers search and hire service providers "on demand" to get projects or jobs done quickly and cost effectively. In the services exchange medium, a service provider is able to create an online professional profile in order to be immediately connected to a buyer looking for the service provider's expertise. Typically, the service provider's online professional profile describes the service provider's professional abilities. The buyer is able to review the service provider's online professional profile to make an informed hiring decision. The buyer is typically able to view the service provider's online professional profile on a web browser or the like of an Internet-ready device. The Internet-ready device is a personal computer, laptop computer, computer workstation, a server, mainframe computer, handheld computer, personal digital assistant, cellular/mobile telephone, smart appliance, gaming console or any other Internet-ready device. A preferred online professional profile is described in the co-pending U.S. patent application Ser. No. 12/474,127, filed May 28, 2009, entitled "Online Professional Services Storefront," which is incorporated by reference.

The digital workroom preferably enables services providers and buyers to work together safely and effectively, to communicate with each other in real time, share files, hold live meetings, automatically store important communication, make job status and progress visible at all times, eliminate paperwork and ensure payment for results. As discussed in detail below, the digital workroom has a plurality of views, each is tailored to the needs of the viewer. The view of the workroom for the buyer is different from the view of the workroom for the service provider. Furthermore, views of the workroom are also different depending on the role of the buyer. Similarly, views of the workroom can be different depending on the role of the service provider.

A project within the services exchange medium is able to comprise one or more project milestones. In other words, a project can be divided into multiple milestones. Typically, cost of a project milestone is a fixed price, negotiated by both the service provider and the buyer, or established by either the service provider or the buyer prior to the service provider starting the project milestone. For example, the project milestone is composing a theme song, which costs $5,000 upon completion. The buyer pays the service provider the fixed price of $5,000 after the project milestone (e.g., composing the theme song) is completed. The project within the services exchange medium is also able to comprise one or more functions. For some services, cost of a function is not a fixed price but is hourly based. For example, the function is filing documents or is processing insurance claims; the buyer pays the service provider on an hourly basis to file documents. The time spent on a function is typically recorded in a log. The project within the services exchange medium is able to comprise one or more project milestones and/or one or more functions.

It should be noted that the terms client and employer are synonymous with the term buyer and can and will be used interchangeably throughout the following discussion. It should also be noted that the term job is synonymous with the term project and can and will be used interchangeably throughout the following discussion. For purposes of discussion, assume the buyer is a startup company, in which Eshaan is a manager at and has two open projects within the services exchange medium. Service providers TJ, Ally and Jay are hired by Eshaan to work on the first project called "Web/Application GUI Design." TJ, Ally and Jay are team members of the first project. Service provider Nenette is hired by Eshaan to work on the second project called "Webby's ePayment Functionality." Nenette is a team member of the second project. Although the service providers are illustrated as being individuals in the following discussion, a service provider can be a company with a plurality of individuals. Furthermore, it should be apparent from the discussion that a buyer can instead be an individual.

Introduction to Key Components

The services exchange medium in some embodiments has an invoicing component. The invoicing system provides TJ with an opportunity to submit an invoice to Eshaan and/or others (e.g., finance manager) on the team during and/or after completion of the project. An invoice is typically submitted to Eshaan after completion of a project milestone or on a periodic basis of performing functions or in any other suitable manner, such as when billable time has been approved. An invoice is automatically generated periodically or user generated via user intervention. After receiving an invoice, Eshaan is able to view and review the invoice, and decide whether or not to pay TJ. The invoice in some embodiments conveniently includes a one-click Pay button which allows Eshaan to initiate payment to TJ. The invoice in some embodiments is able to be viewed in an email client, on a web browser, or the like (such as a WAP browser). The invoice in some embodiments is able to be saved, printed and/or forwarded to another.

The services exchange medium in some embodiments also has a status reporting component. The status reporting system can be offered or requested by TJ, required by Eshaan, or both. At predetermined intervals, such as on a weekly basis, Eshaan automatically receives from TJ through the services exchange medium a status report. The status report provides Eshaan with an automatic, periodic update regarding TJ's progress of the project. However, a status report can be generated via user intervention when needed. The status report is generated by a process and is a tool to communicate answers to typical questions such as, but not limited to: What did you do for me this week? Is the progress of the work/project on track? Will the work/project be done on time? It should be noted that the term time sheet is synonymous with the term status report and can and will be used interchangeably throughout the following discussion.

The status reporting component is configured to advantageously provide Eshaan visibility to the remote relationship with TJ, since TJ could be working from anywhere, including from another country. As one example, assume Eshaan is a manager and TJ is a remote worker. Eshaan's supervisor asks Eshaan whether all his remote workers will deliver on schedule. Eshaan is depending on all his remote workers, including TJ, to deliver on time. However, since TJ works remotely, Eshaan is not able to physically monitor TJ's progress. Fortunately, the status report easily gives Eshaan visibility into the remote relationship to assess TJ's progress. Put differently, status reports help service providers and buyers stay in close communication and exchange information about the current status of a job, including tasks, hours, logs and journal entries, attachments and plans for the coming week. The status report in some embodiments is able to be viewed in an email client, on a web browser, or the like (such as a WAP browser).

The status report in some embodiments conveniently includes a one-click Invoice button which translates all predetermined information from the status report to the appropriate invoice. Entries in the invoice are automatically populated based on the information from the status report. Alternatively, the entries in the invoice are automatically populated based on information from a plurality of status reports. For example, if Eshaan pays TJ on a monthly basis and status reports are generated to Eshaan on a weekly basis, the entries in the invoice are populated based on four status reports; the invoice is submitted to Eshaan at the end of the month.

The services exchange medium in some embodiments also has a work tracker component. The terms tracker, time tracker and work tracker are synonymous and are used interchangeably throughout the following discussion. Preferably, a work tracker is automatically launched when TJ is logged into the services exchange medium (e.g., signed in via the services exchange medium home page) or is manually activated by TJ when TJ is in a workroom. The work tracker in some embodiments is able to be viewed on the web browser or the like. Alternatively, the work tracker is a software application that is first downloaded on to TJ's Internet-ready device and is subsequently launched without logging into the services exchange medium. Put differently, the work tracker is a web application or a stand alone software application installed on a client machine. TJ typically needs to only sign in once; thereafter, the work tracker automatically logs TJ into the services exchange medium when the Internet-ready device starts. However, once the work tracker is launched, the work tracker couples and maintains a link the services exchange medium, delivering data to and/or from the services exchange medium in real time regarding the project. Preferably, the work tracker establishes an authenticated session with the services exchange medium. In some cases, communication between the two is over a secure connection.

The work tracker automatically recognizes who TJ is upon launching the work tracker and knows all of TJ's projects currently open within the service exchange medium. The work tracker system allows TJ to select a project to keep track of, specifically when and what TJ is working on. As such, the work tracker allows TJ to switch between open projects TJ is working on within the services exchange medium.

Regardless of the manner in which the project is contracted or negotiated between TJ and Eshaan, TJ is able to capture relevant information (e.g., progress) regarding different aspects of the project. As described above, a project is able to comprise one or more project milestones and/or one or more functions. TJ is able to track a project milestone and/or one or more functions using the work tracker. In some embodiments, the work tracker is a productivity tool that helps service providers track time spent on individual projects or jobs.

The work tracker in some embodiments conveniently includes a one-click Submit button which translates all collected information from the work tracker to the status report. Entries in the status report are then automatically populated based on the information collected by the work tracker. Alternatively, the entries in the status report are automatically populated based on information collected by a plurality of work trackers (e.g., multiple sessions of the work tracker). For example, if TJ uses 15 sessions of the work tracker (e.g., uses the work tracker 15 times) during a status report period, then the entries in the status report are populated based on the 15 sessions of the work tracker. The status report period is based on the predetermined interval established by TJ and/or Eshaan, or by the services exchange medium.

FIG. 1 illustrates an exemplary system 100 of the work tracking component 105, the status reporting component 110, and the invoicing component 115 in accordance with the present invention. As discussed above, TJ using a work tracker while working on a project on a particular day is able to generate a new status report or update an existing status report by clicking on the Submit button. One or more work trackers by one or more team members are used to populate entries in the status report. Typically, the status report is periodically sent to Eshaan for review. For example, the status report is a weekly status report or a monthly status report. Other status reports are possible. For each status report generated, TJ is able to translate or propagate all information from the status report to an invoice by clicking on the Invoice button. One or more status reports are used to populate entries in the invoice. Eshaan is able to initiate payment by clicking on the Pay button associated with the invoice. The work tracking component 105, the status reporting component 110 and the invoicing component 115 are separate components or, alternatively, all are integrated into one component within the services exchange medium. Preferably, the system 100 allows service providers to conveniently activate the components sequentially without needing to locate each component when needed.

Figure 2:
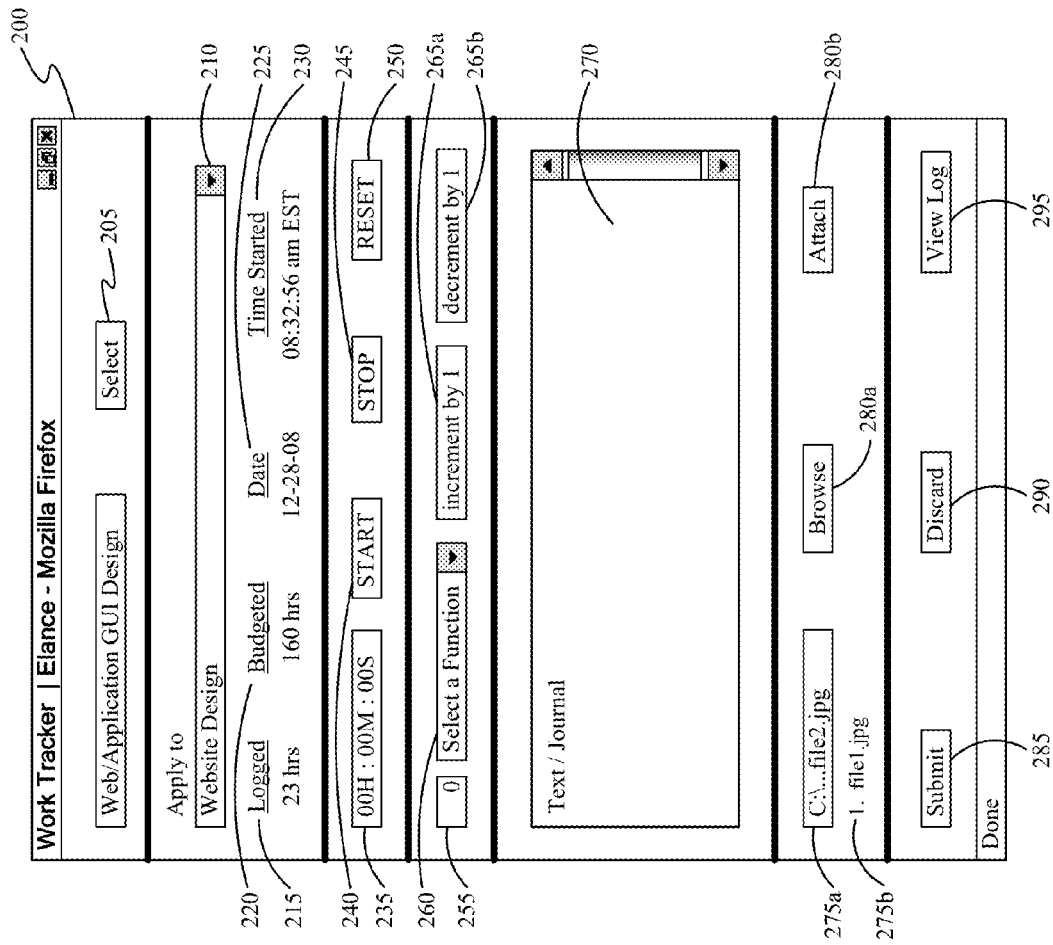
Figure 3B:
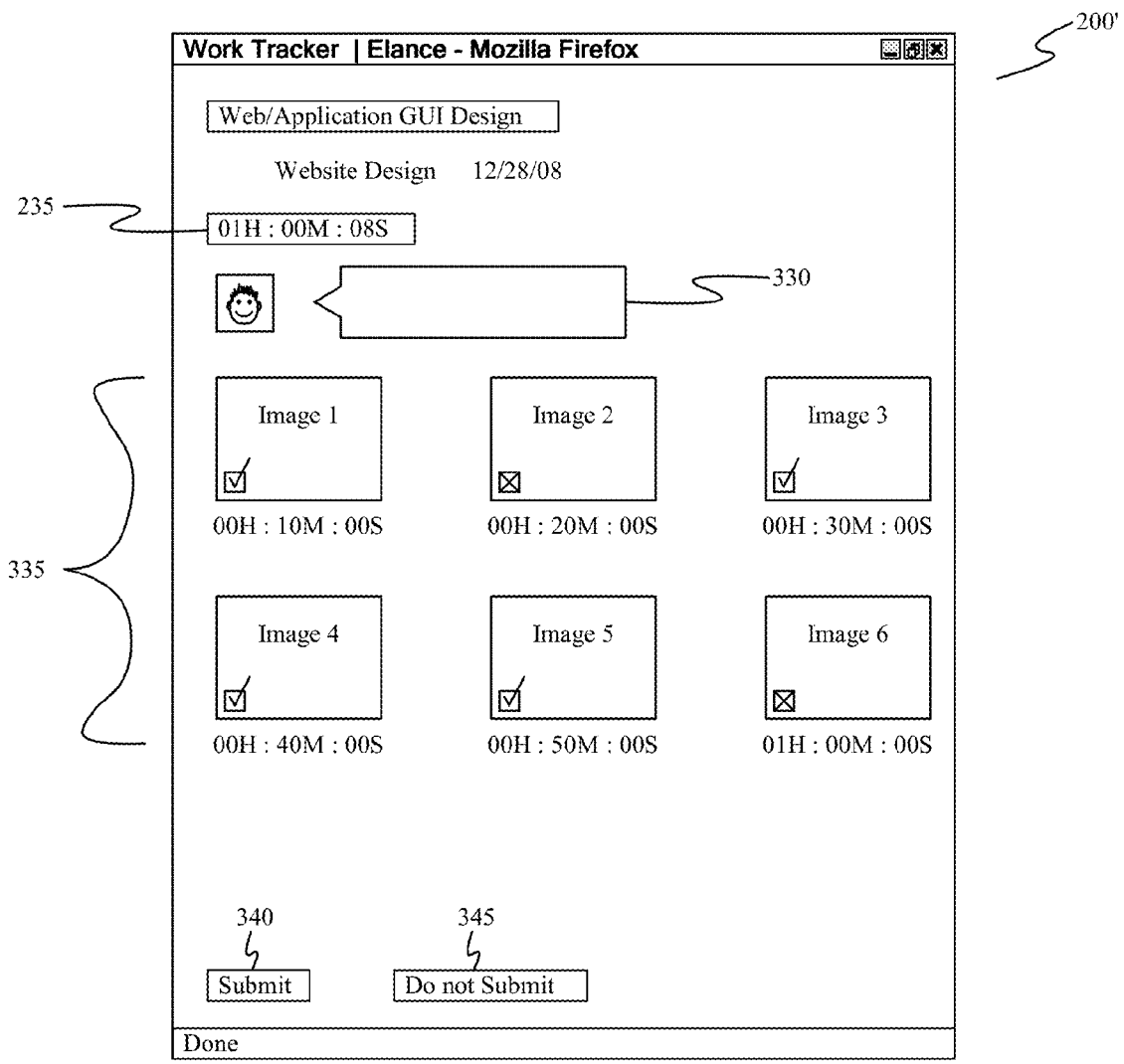

The work tracking component 105 and the status reporting component 110 will each now be described in detail. FIGS. 2-3B illustrate an exemplary work tracker 200 in accordance with the present invention. As discussed above, the work tracker 200 is automatically launched upon TJ signing online into the services exchange medium, manually launched from an online workroom, or manually launched from TJ's Internet-ready device. In some embodiments, manually launching the work tracker 200 will automatically log TJ into the services exchange medium. Regardless of how the work tracker 200 is launched, the work tracker 200 maintains a constant link with the services exchange medium. In some embodiments, the constant link is an open connection. Alternatively, the constant link is a periodic poll.

FIG. 2 illustrates the work tracker 200 displayed in the web browser when the work tracker 200 is launched online, although the work tracker 200 can also be displayed in similar browsers. The work tracker 200 allows TJ to select a project that he wants to keep track of via a Select button 205. If TJ wants to track a particular project milestone, then TJ is able to select that project milestone via an Apply To selection feature 210. Alternatively or in addition, TJ is able to keep track of functions for the project or, more specifically, for a project milestone.

After TJ selects a project milestone to keep track of, information regarding the project milestone is automatically generated. Assume, as illustrated in FIG. 2, TJ has selected the project "Web/Application GUI Design" and the project milestone "Website Design," information regarding this project milestone including, but not limited to, Hours Logged 215 and Hours Budgeted 220 are displayed. For example, number of hours logged so far for "Website Design" is 23 hours and number of hours budgeted for "Website Design" is 160 hours. Such information is typically based on data previously logged and saved within the services exchange medium for that project milestone. Other useful information including, but not limited to, current date 225 and current time 230 can also be displayed. The current time is typically displayed in a time zone based on where the service provider is located. Alternatively, the time zone displayed is a default time zone such as EST.

The work tracker 200 also allows TJ to attach one or more files that he wants Eshaan to view regarding the project milestone via a Browse button 280a and an Attach button 280b. A file is an image file, a text file, an audio file, a compressed file, or any other suitable files. Name of the selected file is displayed in a text box 275a, and attached files are listed in an area 275b below. Next to each file listed in the area 275b is a Remove button (not illustrated) to allow TJ to remove the attached file.

As discussed above, TJ is able to switch between different project milestones to keep track of within a single work tracker 200. Information collected by the work tracker 200 is automatically saved to allow TJ to switch between tracking different project milestones within a single work tracker 200. Similarly, TJ is able to switch between projects within a single work tracker 200. In some embodiments, the information collected by the work tracker 200 is locally saved on TJ's Internet-ready device before the information is submitted, and thereafter deleted from the Internet-ready device, to the services exchange medium. Preferably, the information is securely saved on the Internet-ready device to prevent tampering or misuse of information.

The work tracker 200 in some embodiments allows the service provider to keep track of a number of times that functions are performed via a function field 260, an increment button 265a, and a decrement button 265b. For example, assume for the project "Web/Application GUI Design," TJ is also required to work 40 hours per week processing claims, taking calls, and replying to emails. Current number of claims processed, current number of calls taken, and current number of emails replied are all initialized to zero when a work tracker is launched. When TJ processes a claim, TJ selects the appropriate function (e.g., "Claims Processed") using the function selection field 260 and clicking on the increment button 265a to increment the number of claims processed. The number of claims processed is updated in a number field 255. The number of calls taken and the number of emails replied are similarly updated. The number of claims processed, the number of calls taken and the number of emails replied are automatically transmitted to the services exchange medium, allowing TJ to switch between updating different functions within a single work tracker 200. The decrement button 265b allows TJ to decrement a value in the number field 255 when a function has been wrongly incremented. In some embodiments, TJ is able to add a new function to keep track of.

The work tracker 200 in some embodiments has a timer display 235, a Start button 240, a Stop button 245 and a Reset button 250. TJ is able to start the timer when he begins working on the project via the Start button 240. TJ is able to stop the timer when he finishes working on the project or needs to pause the timer via the Stop button 245. However, TJ is able to restart the timer via the Start button 240. TJ is also able to reset the timer when needed via the Reset button 250. The timer display 235 indicates to TJ how long he has been working on a project, such as on a project milestone (fixed fee) and/or on one or more functions (hourly fee), since the work tracker 200 has been launched.

In some embodiments, when the timer is started for the functions being tracked, the Hours logged 214 and the Hours Budgeted 220 are displayed accordingly. For example, the Hours logged 215 displays number of hours logged so far for working on the functions. The Hours Budgeted 220 displays number of hours budgeted for working on the functions. The clock is typically running on TJ's Internet-enabled device, although time validation occurs on the server side (services exchange medium) to prevent falsification of time worked.

The work tracker 200 in some embodiments has a text or journal field 270 which allows TJ to enter comments, notes, reminders, and other useful information regarding the project. Alternatively, useful information is saved in a video clip or an audio clip which TJ is able to upload.

The work tracker 200 in some embodiments has a Submit button 285, a Discard button 290 and a View Log button 295. TJ is able to generate or update one or more status reports by clicking on the Submit button 285. All data locally saved while using the work tracker 200 is transmitted to the services exchange medium for populating the appropriate status report. In some embodiments, the data is thereafter deleted. TJ is also able to discard information collected by the work tracker 200 by clicking on the Discard button 290. Typically, a confirmation window appears, asking TJ whether he wants to proceed with discarding the information collected by the work tracker 200 without generating or updating the one or more status reports. In some embodiments, the generating and updating via the Submit button 285 is an independent functionality from the real-time communication feature of the work tracker 200, which is discussed in detail below. TJ is also able to view a log for the current status report period by clicking on the View Log button 295.

When the View Log button 295 is activated, another window typically appears. Alternatively, the work tracker 200 expands in size to display a log. FIG. 3A illustrates a side window 300 appearing to the right of the work tracker 200. The side window 300 displays a log 305 of each day of the status report period regarding the selected project milestone or, alternatively, the functions. In some embodiments, the current day is also displayed with an indicator 325. As illustrated, the current day is Sunday, Dec. 28, 2008, and the log for Thursday, Dec. 25, 2008, is empty because TJ did not use the work tracker 200 on that day. Even though the work tracker 200 did not log hours on Thursday, TJ will be able to manually edit the hours in the corresponding status report.

A Close button 310, a Print button 315, and a Save button 320 are provided in the side window 300. Clicking on the Close button 310 retracts the side window 300. Clicking on the Print button 315 allows the service provider to print out the log 305. Clicking on the Save button 320 allows TJ to save a copy of the log 305 in a text file format, an image file format, or in any other suitable file formats. In some embodiments, an Edit button (not illustrated) is associated with each day that allows TJ to make changes to a respective day in the log 305. Alternatively, a universal Edit button (not illustrated) is provided that allows TJ to make changes to any day in the log 305. Any edits made will automatically be updated in the status report if TJ saves the modification via the Save button 320 and submits the information via the Submit button 285.

In some embodiments, the work tracker 200 has a View All Logged button (not illustrated) that allows TJ to view all entries of all project milestones and functions logged during the status report period. As such, TJ is able to see what was done and a total number of hours worked per day during the status report period.

The work tracker 200 in some embodiments is a not "spy" tool. Instead, the work tracker 200 is a convenience tool that enables service providers, such as TJ, to keep track of time spent on one or more projects. Alternatively, the work tracker 200 can be required by Eshaan to monitor TJ's productivity and efficiency. TJ is also able to edit information, such as the time, in the work tracker 200 before creating or updating a status report.

In some embodiments, the work tracker is configured to detect activity intensity, such as keyboard entry and mouse movement. The work tracker is also able to gather other productivity information that is useful in verifying work done. For example, the work tracker in some embodiments is configured to periodically or at random times take screen shots of TJ's desktop. Alternatively, the work tracker supports an on-demand screen shots feature which allows Eshaan to request screen shots to be taken at any time. Preferably, the screen shots capture what TJ is currently working on. The work tracker will display the screen shots taken before submitting the information to Eshaan, for example, at a predetermined periodic basis such as hourly because, at times, the screen shots may capture private or sensitive information that TJ does not want others to see. The work tracker also allows TJ to delete screen shots and enter comments regarding the screen shots and/or the current project.

FIG. 3B illustrates the work tracker 200' displayed to TJ prior to submission of the information to Eshaan In some embodiments, the work tracker 200' interrupts TJ's work on an hourly basis. The work tracker 200' displays the clock 235 at the time of disruption. The work tracker 200' also displays a text box 330 for TJ to enter tweets. As illustrated, six screen shots 335 are displayed, each taken at 10 minute intervals although screen shots can be taken at random intervals.

TJ is able to select the screen shots that he does not want to be submitted to Eshaan. For example, Image 2 and Image 6 have an "x" designating that those screen shots should be removed prior to submission. Although the screen shots with an "x" will not be submitted to Eshaan, Eshaan will know that screen shots at times 20 minutes and 1 hour have been deleted. Likewise, if TJ clicks on the Do Not Submit button 345, Eshaan will know that TJ has decided not to update his progress regarding the job within the last hour. However, as explained above, prior to submission, TJ is able to comment about his work, such as providing an explanation as to why some screen shots are discarded. The ability to edit and provide messages advantageously allows service providers to fix issues of when private information is accidentally captured by the screen shots. The information is submitted by clicking on the Submit button 340. Clicking on the Submit button 340 or the Do Not Submit button 345 returns TJ to the work tracker 200.

When TJ submits information (e.g., tweets, screen shots, and/or productivity information), the data is streamed live to the services exchange medium. The services exchange medium, in turn, streams the data to Eshaan Eshaan, if he wanted, is able to provide input regarding the work. Eshaan can also use the information to determine whether he is comfortable paying for the hour's worth of work, even though there may be deleted screen shots.

The screen shot feature of the work tracker 200 is ideal especially when trust has not been established between a service provider and a buyer early on in a new relationship. The service provider's track record with the buyer is typically full of holes, especially in the first few weeks of work. On the other hand, after a period of time when the trust has been established, the service provider and/or the buyer can disable this screen shot feature since "auditing" will be less relevant. This screen shot feature is similar to a security camera—you only use it when you need it. It is a peace of mind to know that this feature exists when you need it.

As discussed above, when TJ clicks on the Submit button 285 (FIG. 2) in the work tracker 200, a new status report is generated or an existing status report is updated. The status report is generated if a first entry is being made for that status report period; otherwise, the status report is updated when subsequent entries are added. The status report has typically two versions: a first version (back-end version) that is viewable and editable by TJ, and a second version (front-end version) that is viewable by Eshaan Typically, information from one or more work trackers by one or more team members are automatically and accurately propagated to the corresponding status report. In some embodiments, Eshaan automatically and periodically receives from TJ through the services exchange medium a comprehensive status report.

An automatically generated status report or time sheet is also a convenience tool. A status report is modifiable or editable by TJ at any time prior to the scheduled delivery of the status report to Eshaan TJ is able to click on the Invoice button, as illustrated in FIG. 1, of the first version of status report to propagate all predetermined information from the status report to an invoice. In other embodiments, the first version of the status report has an indicator which lets TJ know that the status report has been invoiced, that the status report has not been invoice (e.g., draft), or that the status report has been invoiced but has since been modified and is not in sync or updated with the invoice. TJ is able to synchronize the modified status report with the invoice before the invoice is sent or resent to Eshaan After receiving the invoice, Eshaan is able to review the invoice and pay TJ via the Pay button, as discussed above (FIG. 1).

FIG. 4 illustrates an exemplary status report 400 as received and viewed by Eshaan in accordance with the present invention. The second version of the status report 400 is viewable in an email client, on a web browser, or the like (such as a WAP browser). Typically, the status report 400 includes the status report period, the project name, the buyer's name and relevant information, and the service provider's name and relevant information. In some embodiments, Eshaan is able to communicate with TJ via a private message board, email, chat, a phone call, or any other communication methods. The different communication methods are displayed below the buyer's name as linkable items. In some cases, only the authorized communication methods are displayed. By clicking on TJ's name and/or his displayed information, Eshaan is able to view TJ's online professional profile.

The status report 400 in some embodiments has a Log section 405, a Progress This Week section 410, or both. The Log section 405 is typically displayed if TJ worked on one or more functions during the status report period. The Progress This Week section 410 is typically displayed if TJ worked on one or more project milestones during the status report period. The status report 400 also has a Plans for Next Week section 415 and a tool bar 420.

In the Log section 405, a table 425 is displayed, showing number of hours worked and functions completed during days of the status report period. In addition, aggregates of the number of hours worked and functions completed are shown for the status report period and in total. The table 425 in some embodiments also show a number of hours budgeted to work on the functions. The table 425 preferably displays hours logged in an easy-to-read manner, broken down into functions and days of the status report period. In some embodiments, the table 425 also displays any text/journal provided by TJ via the work tracker 200. In some embodiments, in the Log section 405, the status report 400 is able to differentiate between logged hours by the work tracker 200 and the hours edited by TJ In the Progress This Week section 410, all the project milestones for the project are listed. As illustrated, the two project milestones listed are "Logo Design" and "Website Design." A completion bar 430, a due date 435, and a status symbol 440*a*, 440*b* are associated with each project milestone. The completion bar 430 indicates how far along TJ is in regards to the project milestone. The due date 435 is the date on which the project milestone is to be completed and delivered to Eshaan. The status symbol 440*a* indicates that the milestone is on schedule, whereas the status symbol 440*b* indicates that the milestone has been delayed. Typically, if the project milestone is delayed, a delay date is also shown. In some embodiments, the status symbol 440*a* is a green dot and the status symbol 440*b* is a red dot. Other status symbols are possible.

The status symbols is a layer of "air traffic control" that provides the services exchange medium a visibility of how projects or engagements are progressing. Based on the status symbol, the service exchange medium is able to monitor how well a service provider is performing within the services exchange medium, both at a high level in terms of projects and at a granular level in terms of project milestones. Such information is useful and is able to be provided to other buyers regarding a service provider. For example, if TJ is always on time in terms of delivering project milestones, then a Services Exchange Medium Recommended indicator is displayed next to TJ's name in all searches and/or in his professional profile. The layer of air traffic control allows the services exchange medium to find out about projects that have been delayed before due dates have passed and/or problems or issues regarding service providers. By finding out early on regarding progress of projects, the services exchange medium is able to provide incentives to service providers to deliver their projects on time.

Other data are also associated with each project milestone. For example, a Last Checked In date 445, Deliverables 450, a Budgeted amount 455, an Actual amount 460, and Comments 465 are associated with each project milestone and are displayed. The Last Checked In date 445 is the date in which TJ last used the work tracker 200 to track the progress of the project milestone. Deliverables 450 include links to files uploaded by TJ using the work tracker 200, as discussed above. The Budgeted amount 455 refers to the number of hours allocated for the project milestone. The Actual amount 460 refers to the number of hours TJ has already dedicated or worked on the project milestone. The Comments 465 displays the comments entered by TJ in the text or journal field 270 of the work tracker 200.

If the project milestone requires an action on the part of Eshaan, a Your Action Required message 470 is displayed. The Your Action Required message 470 indicates to Eshaan that he owns the next action to be taken and specifically states what he needs to do. For example, the Your Action Required message 470, as illustrated in FIG. 4, indicates to Eshaan that he will need to review the logo design (the logo design has been 100% completed by TJ) and approve or sign off on the completion of the logo design project milestone.

In some embodiments, the status report 400 only includes the Log section 405 if there are no project milestones associated with the project. Alternatively, the status report only includes the Progress This Week section 410 if the project does not involve one or more functions. Alternatively, the Log section 405 and the Progress This Week section 410 are all included if the project includes both one or more functions and project milestones.

The Plans for Next Week section 415 in some embodiments typically indicates to Eshaan what TJ had accomplished in the current status report period and what he plans to accomplish during the next status report period. For example, a Milestones and Deliverables area 475 and a What Will Be Done? area 480 are illustrated in FIG. 4. The Milestones and Deliverables area 475 summarizes the project milestones and the functions TJ has worked on during the week. The What Will Be Done? area 480 typically summarizes what needs to be done the following week.

In some embodiments, a service provider is able to edit or modify a status report before the status report is submitted to a buyer. This first view of the status report is illustrated in FIG. 6C and is further discussed below. Typically, after the status report is submitted to the buyer, the status report cannot be edited or modified by the service provider. Alternatively, the status report is editable or modifiable even if the status report has been submitted to the buyer or the invoice has been generated.

Referring back to FIG. 4, the tool bar 420 provides Eshaan options of what he is able to do with the received status report 400. Typically, the tool bar 420 includes a time stamp 420a of when the status report was received by Eshaan or, alternatively, when the status report was sent to Eshaan. The tool bar 420 in some embodiments includes a Close button 420b, a Disagree button 420c, a Forward button 420d, a Print button 420e, and/or a Save button 420f. More or less buttons, such as a Comment button or a Pay button, are contemplated.

Eshaan is able to exit or close the status report 400 by clicking on the Close button 420b. The tool bar 420 advantageously allows Eshaan to forward the status report 400 to Eshaan's supervisor or others via the Forward button 420d. Eshaan is also able to print a hard copy of the status report 400 via the Print button 420e to bring to a meeting or to be kept in TJ's physical folder or the like. Eshaan is also able to save a soft copy of the status report 420 in an image format, a text format, or any other suitable formats, via the Save button 420E In some embodiments, Eshaan is also able to directly pay TJ from the status report 400 via the Pay button (not illustrated).

If Eshaan disagrees with TJ regarding any part of the status report 400, Eshaan is able to click on the Disagree button 420c. TJ is then notified about the disagreement. Eshaan and TJ are then able to work together to resolve the disagreement. In some embodiments, the disagreement automatically notifies the services exchange medium, and a performance team within the services exchange medium will be assigned to monitor progress and resolution of the disagreement.

Eshaan is able to hire more than one service provider to work on different aspects of the project. Each service provider typically has his or her own work tracker. In some embodiments, Eshaan is able to view different status reports from all the service providers. Alternatively, Eshaan is able to view one consolidated status report from all the service providers. In other embodiments, Eshaan is able to view different view invoices from all the service providers. Alternatively, Eshaan is able to view one consolidated invoice from all the service providers. Yet, in other embodiments, Eshaan is able to view all service providers from all projects Eshaan has open within the services exchange medium.

Figure 5:
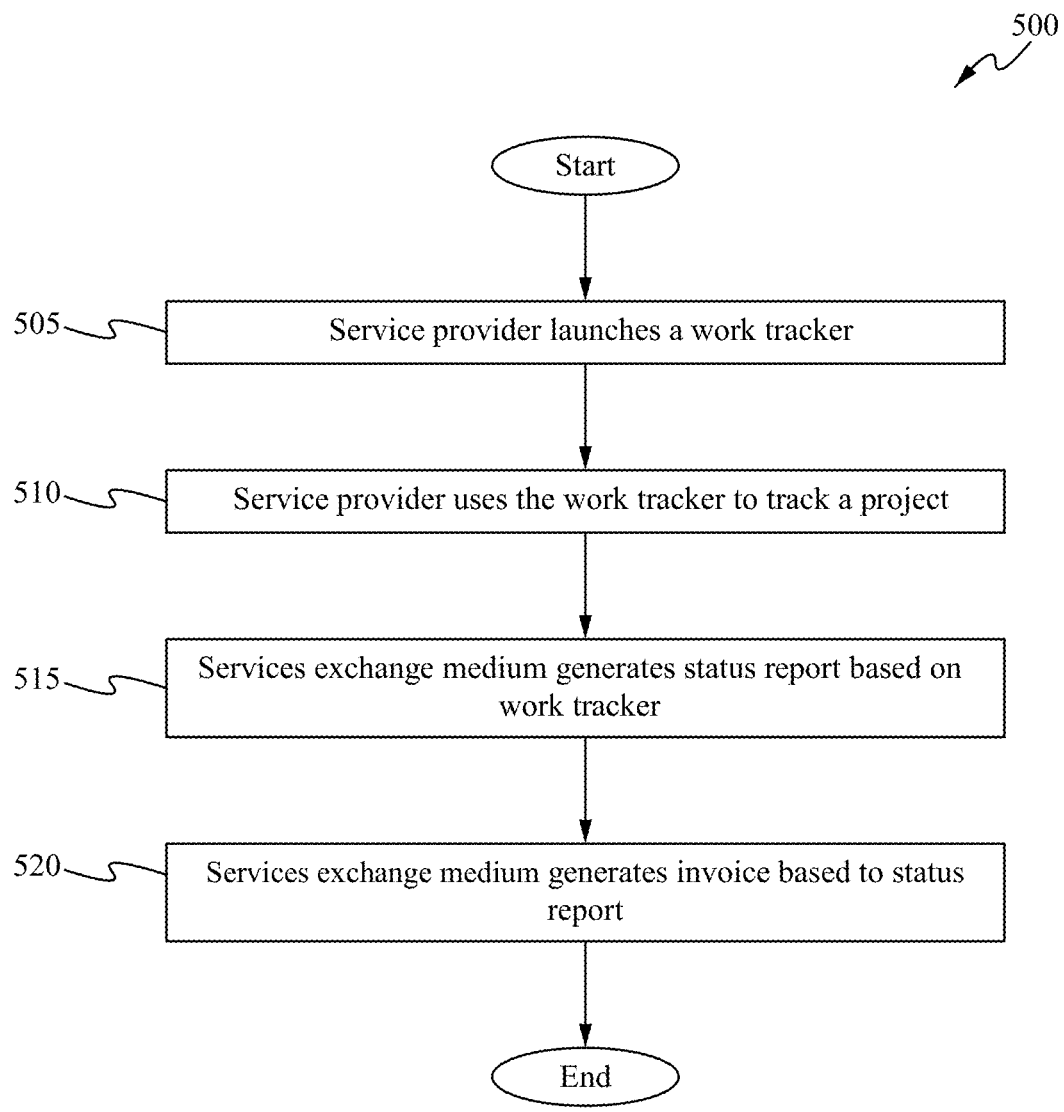
FIG. 5 illustrates an exemplary process of generating an invoice based on a status report in accordance with the present invention.

FIG. 5 illustrates an exemplary process 500 of generating an invoice based on a status report in accordance with the present invention. At a step 505, a service provider launches a work tracker. The work tracker can be automatically launched as a result of the service provider logging into the services exchange medium, manually launched online through a workroom, or locally launched on the service provider's Internet-enable device. Regardless how the work tracker is launched, the work tracker provides or transmits real time work data to the services exchange medium. At a step 510, the service provider uses the work tracker 200 to track a selected project or more, specifically a project milestone or functions. The service provider is able to switch between projects, between milestones and/or between functions. After the service provider is finished working, the service provider clicks on the Submit button. In some embodiments, the service provider is able to edit the information tracked by the work tracker 200 before clicking on the Submit button. At a step 515, after the service provider clicks on the Submit button, the services exchange medium automatically generates a status report 400 based on the information collected by the work tracker 200. In some embodiments, the service provider is able to edit the status report 400 before the status report 400 is sent to the buyer. At a step 520, the services exchange medium automatically generates an invoice based on the status report 400 when the service provider clicks on the Invoice button in the status report 400. In some embodiments, the service provider is able to make adjustments/edits, include comments, or both to the generated invoice.

The Workroom

When a project or a job is awarded in the services exchange medium, a workroom is automatically created to help manage the job. Each job has its own workroom, which is associated with it a unique web page address and a unique email address. Messages, such as emails, sent to the unique email address become part of the workroom content. In some embodiments, workroom content cannot be removed or deleted from the workroom, although certain workroom content can be selectively hidden from view by the viewer.

The workroom is preferably a private online workspace that facilitates collaboration and tracks communication among team members of the workroom. The workroom allows team members (e.g., all those who are part of the job) to work together safely and effectively, to communicate with each other in real time, share files, hold live meetings, automatically store communication, make job status and progress visible at all times, eliminate paperwork and ensure payment for results. Team members are buyers and service providers that are part of the job. The workroom is typically accessible only to its team members, although guests, such as a client or a colleague, can be invited to collaborate with team members in the workroom. The guests are able to view (for a set period of time) the workroom or, more specifically, an aspect of the job (e.g., a deliverable). A guest typically receives an invitation in the form of an email that includes a hyperlink to the workroom. The guest is given a predetermined period such as a day, a week, or a month to access the workroom or to view a deliverable. After the period automatically expires, the guest is no longer privileged to enter the workroom.

A buyer, such as Eshaan, typically sets up a "company" account with the ability to add team members and assign them role-based permissions. Eshaan is able to add as many people as Eshaan wants and assign them roles. Team members preferably can be added and removed at any time. As such, team members of the workroom thereby automatically gain and lose access to the specific workroom at any time. The ad-hoc feature of adding and removing team members advantageously allows the buyer to manage team members efficiently and effectively, and to easily and spontaneously include new team members when, for example, additional help is required.

Although the following discussion only includes service providers, other than Eshaan, as team members, team members can also include individuals from Eshaan's company. Team members that are service providers are referred to as external team members. Individuals from Eshaan's company working on the job are referred to as internal team members. External and internal team members are collectively referred to as team members. A workroom preferably facilitates collaboration among internal team members and/or between internal team members and external team members.

Not every member of a workroom is given the same access permission. In fact, there is preferably a strict role definition within the services exchange medium. There are different roles for service providers and different roles for buyers. For example, a service provider may be permanent staff or a contractor. A buyer may be an owner, a manager, or a staff member. A service provider who is a permanent staff can be given more access to the workroom than a service provider who is a contractor or a guest who has been invited by the buyer to view a particular deliverable. A guest can have an even more restricted access than a permanent staff or a contractor. In some embodiments, viewable links in the workroom (see FIGS. 6A-6C) or permission are created based on what the role of the viewer is. In other words, the view is customized for each role such that, instead of simply displaying non-actionable links, those links are simply not displayed as part of the workroom.

Figure 6A:
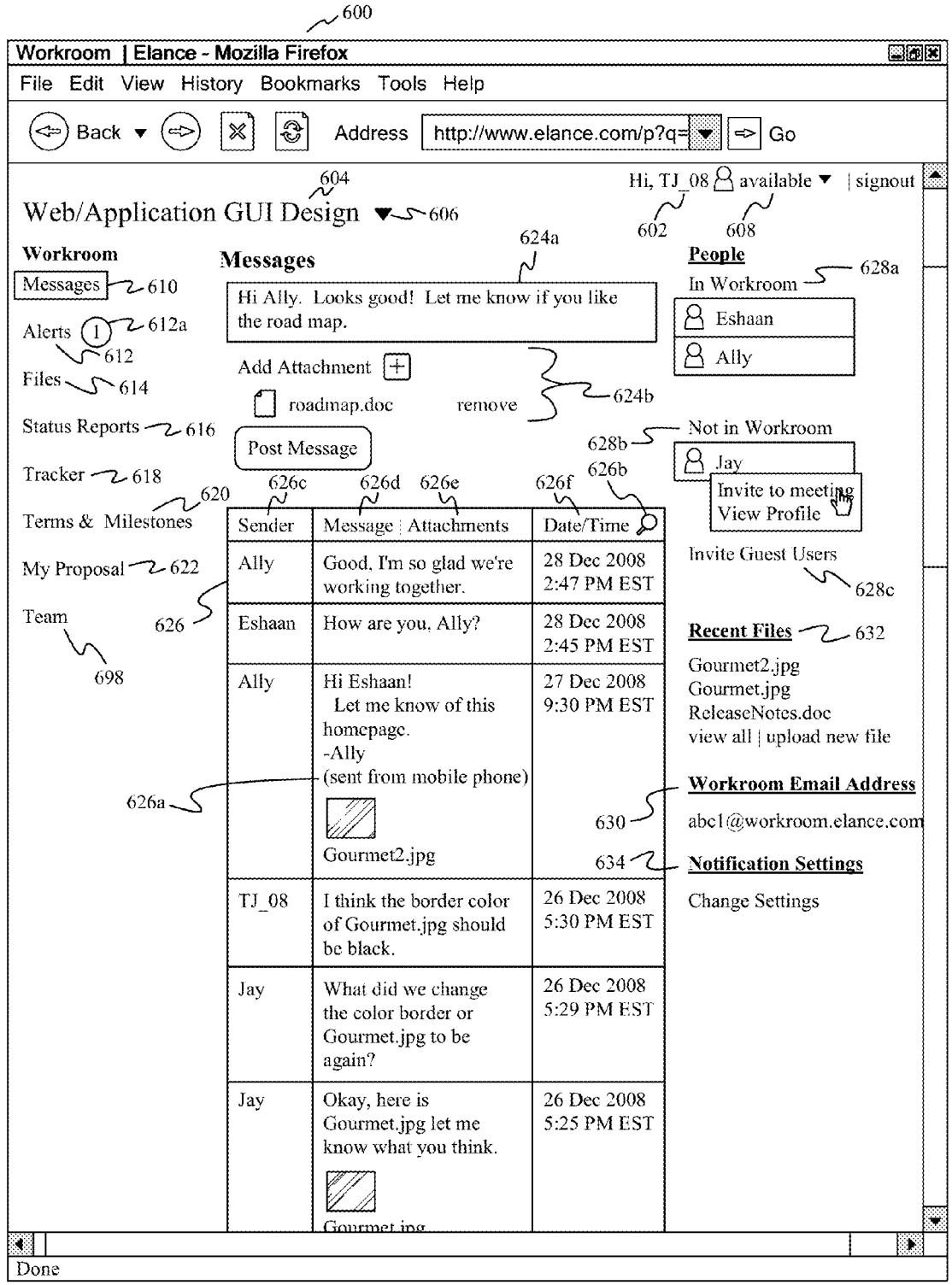

Assume TJ is a permanent staff working for Eshaan. TJ is able to view the assigned workroom for the job typically by logging into his account within the services exchange medium. FIG. 6A illustrates an exemplary view of the workroom 600 in accordance with the present invention. The workroom 600 is typically a page viewable on a web browser or the like. TJ's screen name or user ID ("TJ_08") 602 and the job name ("Web/Application GUI Design") 604 are both displayed on the page. A pull-down menu 606 allows TJ to switch between jobs or workrooms. For example, TJ can also be working on another job called "Sushi on Wheels" and can switch to that workroom by selecting "Sushi on Wheels" via the pull-down menu 606. The default status 608 of TJ once logged into the account is "available," although TJ is able to appear offline to others while on the services exchange medium by changing the status 608 to "invisible." In some embodiments, TJ is able to set the default status 608 to "invisible." Other statuses are contemplated.

In some embodiments, TJ being a permanent staff is able to view and click on links to Messages 610, Alerts 612, Files 614, Status Reports 616, Tracker 618, Terms & Milestones 620, My Proposal 622, and Team 698 from the workroom 600. Each of the sections will now be discussed in turn. However, it should be noted that not all jobs require all the features available in the workroom 600.

Messages.

Under Messages, as illustrated in FIG. 6A, TJ is able to type a message in a text box 624a, add and delete attachments 624b to the message, and then post the message to the workroom. The text box 624a automatically expands when writing a long message or, alternatively, limits the message to a predetermined number of characters or words. Posted messages are displayed sequentially in a table 626, wherein each entry is accompanied by the sender's name and the date/timestamp. As illustrated, the message thread between the team members is shown. In Ally's first message, the thumbnail of an attached file "Gourment2.jpg" is displayed. By clicking on the thumbnail, the corresponding file opens.

In some embodiments, TJ is able to filter the message thread by date range and sender via the filter symbol 626b to view selected messages. In some embodiments, the messages are typically sorted and displayed in the table 626 based on the date/time submission 626f. Alternatively, the messages can be sorted based on the sender 626c, messages 626d, or attachments 626e. In some embodiments, the messages can also be searched and/or filtered.

In some embodiments, a team member can turn on meeting mode to engage in real-time "meeting" when at least two team members are present in the workroom 600. The meeting is automatically transcribed; the transcript is saved for future reference. In some embodiments, the end of the meeting is determined by a period of silence. It is at this time, the rest of the team members are notified with the contents of the meeting by email or any other preferred format.

A list 628 of team members is also displayed. The list 628 is typically broken into sections: those team members who are currently in the workroom 628a and those team members who are not currently in the workroom 628b. As illustrated, aside from TJ, Eshaan and Ally are currently in the workroom 600, while Jay is not currently in the workroom 600. Jay can be completely offline, be online looking for a job, or can be in a different workroom. Regardless, TJ is able to view Jay's profile or invite Jay to join the workroom 600 by mousing over Jay's name. In some embodiments, team leaders, guests or both are identified by a label attached to their screen names.

When TJ invites Jay to join the workroom 600, Jay will automatically receive a join notification. The notification can be in the form of a popup message, an email, a phone call, a text or video message to a handheld computing device such as a cell phone, or can be in other suitable forms of notification. In some embodiments, if Jay is currently signed into the services exchange medium, then a popup message will appear on Jay's Internet-enabled device to join the workroom. If Jay is not signed into the services exchange medium, then Jay will receive, for example, a text message, a video message, a phone call or an email to join the workroom 600 via the message, Jay is taken to the service exchange medium to join the workroom.

The email preferably comes from the workroom 600. Put differently, the sender's address shown in the email is the workroom email address 630, which is automatically provided upon creation of the workroom. As illustrated, the email address for the "Web/Application GUI Design" workroom is "abc1@workroom.elance.com" 630.

The workroom email address 630 allows anyone who is a team member of the workroom 300 to email messages and attachments to the workroom 600 directly from an email client. Alternatively, anyone can email messages/attachments to the workroom 600. In some embodiments, email messages/attachments from those who are not team members are indicated as such. Email messages and attachments then become content of the workroom 600. Typically, the content is posted in the form of a table 626 and/or filed in appropriate folders. In some embodiments, a message sent from a mobile device to the workroom email address 630 are indicated as "(Sent from mobile phone)" 626a.

Typically, when a message post occurs, team members of the workroom are notified of the posting via one or more forms of notification described above. However, team members are able to change the notification frequency via the Change Settings link 634. For example, TJ can change his notification setting such that he only receives notification once a day regarding all postings for the day.

Similar to inviting Jay to join the workroom 600, TJ is able to invite guests to the workroom 600 via the Invite Guest Users link 628c. However, as explained above, guests typically have limited access to the workroom 600. For example, a guest can only view a particular uploaded file. Furthermore, access automatically expires after time period set for the guest.

Under Messages, recent files 632 that have been uploaded to the workroom 600 or recently modified are listed. Recent files include those that are uploaded directly from the workroom 600 and those that are emailed to the workroom 600 via the workroom email address 630. TJ is able to view all of the files uploaded into the workroom 600 or upload new files to the workroom 600.

In some embodiments, the workroom 600 typically provides a process that allows service providers and buyers to manage disputes. In some embodiments, information regarding the status of the dispute is also posted under Messages. For example, an arbitrator can post comments regarding the dispute, which become part of the message thread.

Alerts.

Under Alerts, TJ is able to view alerts posted by the services exchange medium and/or by others trying to communicate with TJ within the services exchange medium. In some embodiments, a number of alerts 612a is displayed to indicate the number of new alerts for TJ.

Files.

Figure 6B:
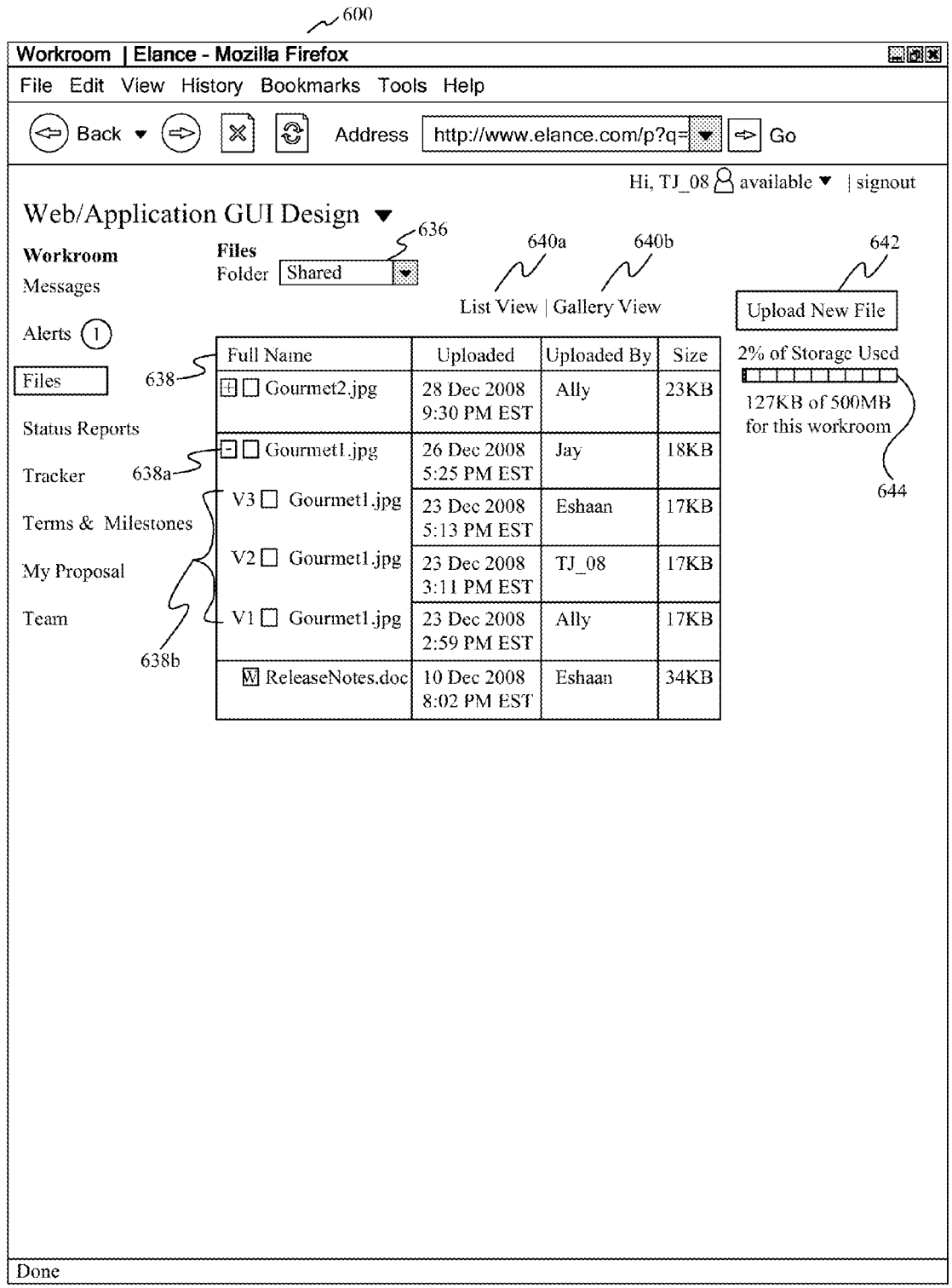
Figure 6C:
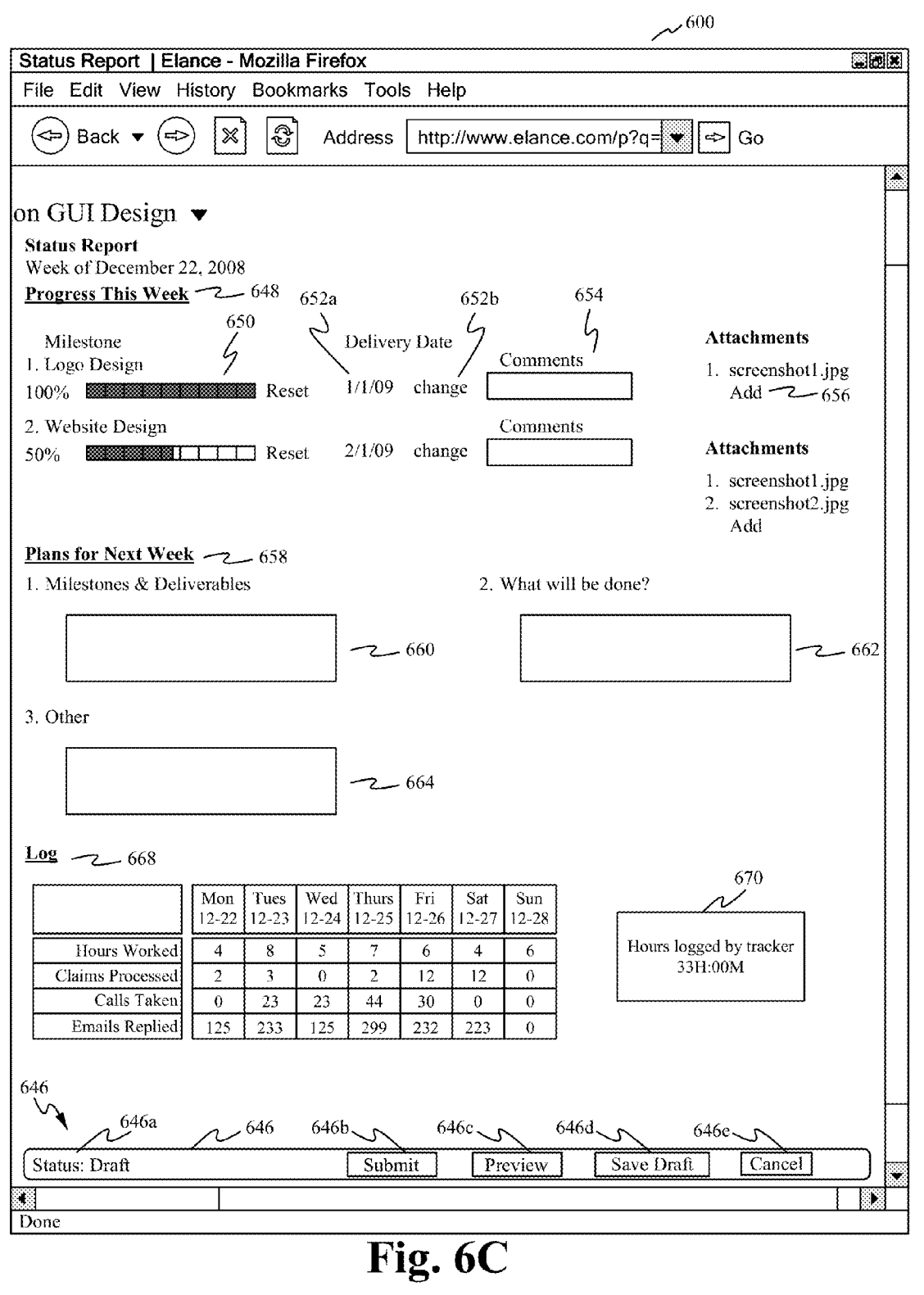

As illustrated in FIG. 6B, TJ is able to view files associated with the job by selecting a folder via a pull-down menu 636. In some embodiments, default folders include a shared folder, private folders and a Job Proposal and Terms folder, although other folders can be created and/or shared among a subset of or all team members.

A shared folder includes all public files that can be accessed by all team members, regardless which side they are on. For example, if TJ wants to upload a file to be shared among all team members, TJ will upload the file into the shared folder. Any team member from either the buyer's side or the provider's side can access these public files, unless they are marked restricted. Only team members with a certain role, such as manager role, and above can see restricted files. Restricted files can be added to either the shared folder or the semi-private folder. Public files not indicated as restricted can be seen by all team members.

Each side of the team has a private folder, which contains files that can only be accessed by that side's team members, unless they are marked restricted. Put differently, a private folder is private to a particular side of the team: the buyer's side or the provider's side. Everybody on the buyer's side are able to see files in the buyer's private folder, however they cannot see the files in the provider's private folder. Similarly, everybody on the provider's side are able to see files in the provider's private folder, however they cannot see the files in the buyer's private folder.

In addition to placing files directly into these folders, the shared folder and private folders accumulate files from different parts of the workroom. Unlike the shared and private folders, the Job Proposal and Terms folder accumulates files from specified areas of the workroom. The Job Proposal and Terms folder typically includes files regarding the job proposal and any terms, including original and modified ones. Team member with a certain role, such as manager role, and above are able to access the files in or add files into the Job Proposal and Terms folder.

As discussed above, a team member can create other folders. For example, TJ can create a personal folder and place any files personal to him in the personal folder. These files can be work in progress files and can only be seen by TJ. However, TJ is able to, in some embodiment, place access permissions on the personal folder to grant other team members to his personal folder. In other embodiments, TJ can create one or more personal folders, including subfolders, to categorize and organize TJ's personal files. In addition to folders, team members are able to organize files using tags. A file can have multiple tags. Team members can navigate to any tagged file from a tag cloud or search.

TJ can upload a new file via an Upload New File button 642 which, in some embodiments, will then prompt TJ to select a folder to save the new file under. If the file to be uploaded has the same name as a file that already exist in the workroom 300, then TJ will be prompted with three options: (1) to rename the file to be uploaded, (2) to upload as the file as a new version, and (3) to reference the previous loaded file having the same name.

In regards to option (2), the workroom 600 automatically keeps tracks of and displays all prior versions of the file for future reference. As illustrated in FIG. 6B, a symbol 638a displayed next to a file indicates whether multiple versions exist for that file. For example, a ⊕ symbol indicates that multiple versions exist and that clicking on the ⊕ symbol will expand the listing. A ⊖ symbol indicates that an expanded list is shown and that clicking on the ⊖ symbol will retract the listing.

In regards to option (3), TJ is able to reference previously uploaded files instead of uploading the same file over and over again. This is particularly useful when TJ is connected to the services exchange medium via a slow connection, such as dial-up, or when TJ is looking for a job by submitting bids for multiple projects. In the later case, TJ need not upload his portfolio each time when submitting a bid, thereby saving TJ's time and memory space within the services exchange medium.

In each workroom 600, a predetermined storage space is allocated. For example, the default storage space per project to store all necessary files is 500 MB, which should be enough for any job. A usage bar 644 is displayed showing how much of the default storage space is used for the workroom 600. In some embodiments, the predetermined storage space is based on the service provider's subscription level, project budget, project account type or other suitable method of allocating storage space.

Uploaded files, regardless of where and how the files are uploaded, are typically displayed in a table 638. Each file is associated with information regarding when the file was uploaded, who uploaded the file, and the size of the file. In some embodiments, files once uploaded to the workroom 600 cannot be deleted to prevent misconduct associated with the job. This feature deals with the trust factor among team members. Put differently, files uploaded are proof that work has been done. Similarly, communication within the workroom 600 cannot be deleted.

In some embodiments, TJ can view the uploaded files in a list format via the List View link 640a or in a gallery format via the Gallery View link 640b. In some embodiments, restricted files, although listed, are only accessible to those who have managerial status or above. For example, an uploaded contract file can be a restricted file.

Status Reports.

As discussed above, the work tracker 200 automatically populates one or more status reports. However, TJ is able to manually edit a status report prior to submitting the status report to Eshaan. This is particularly useful, for example, when TJ has worked without using the work tracker 200.

FIG. 6C illustrates an exemplary status report viewable and editable by TJ in accordance with the present invention. It should be noted that not the entire workroom 600 is not shown in FIG. 6C; instead, only the status report is shown for the sake of clarity. The status report typically displays the week of the report. There are typically three sections: a Progress This Week section 648 which corresponds to the Progress This Week section 410 of the second version of the status report 400, a Plans for Next Week section 658 which corresponds to the Plans for Next Week section 415 of the second version of the status report 400, and an optional Log section 668 which corresponds to the optional Log section 405 of the second version of the status report 400.

In the Progress This Week section 648, TJ is able to report progress in each of the one or more project milestones for the project. A completion bar 650, a delivery date 652a, a text box 654 for comments, and an attachment feature 656 for each project milestone are provided, allowing TJ to report as comprehensively as possible regarding the project milestone. TJ is able to adjust the completion bar 650 to indicate how much of the project milestone is completed. TJ is able to delay the delivery date by clicking on the change link 652b. TJ is able to provide comments via the text box 654 and add any attachments via the Add link 656 pertaining to the project milestone. Each attached file is associated with a delete link (not illustrated) to remove the file.

The Plans for Next Week section 658 allows TJ to comment on what his plans are for the following week. In some embodiments, text boxes 660, 662 are displayed for default questions such as Milestones and Deliverables and What will be done? In other embodiments, a text box 664 allows TJ to enter other comments that TJ wants to convey to Eshaan.

The Log section 668 allows TJ to manually edit the data in the log table. Hours collected via the work tracker 200 are populated in the table. However, TJ is able to manually edit the hours. For example, TJ can manually edit the hours worked for Thursday, Dec. 25, 2008, by adding 7 hours to the log; as noted earlier, TJ did not use the work tracker 200 to keep track of his time on Thursday, Dec. 25, 2008 (FIG. 3A). In some embodiments, the status report or time sheet is able to differentiate between logged hours by the work tracker 200 and edited hours by TJ. For example, the box 670 displays 33 hours as the number of hours logged by the work tracker 200 for the week.

A tool bar 646 provides TJ options of what TJ is able to do with the status report. Typically, the tool bar 646 has an indicator 646a stating the status of the status report. A status report can be a draft or invoiced or out of sync. Other statuses are possible. The tool bar 646 also has a Submit button 646b to submit the status report to Eshaan, a Preview button 646c to preview the status report, a Save Draft button 646d to save the status report as a draft, and a Cancel button 646e to cancel any manual edits currently made. More or less buttons are contemplated. Before the end of a status period, if TJ is satisfied with the weekly status report, TJ is able to submit the status report to Eshaan Otherwise, at the end of the status period, the status report, as last saved, is automatically submitted to Eshaan. The status report allows TJ and Eshaan to stay in sync throughout the duration of the job. In some embodiments, team members of the workroom 600 are notified of the time sheet submission via one of the aforementioned notification techniques.

Tracker.

As discussed above, a work tracker 200 can be launched several ways, including from the workroom 600. The work tracker 200 is an option for a service provider to automatically feed data regarding projects to the services exchange medium in order to, for example, populate the respective status reports. However, since the work tracker 200 is a convenience tool, the work tracker 200 need not be launched when working on a job.

However, the hours logged by the work tracker 200 are guaranteed by the services exchange medium when a buyer, such as Eshaan, fails to approve a time sheet within a certain number of days. TJ using the work tracker 200 will get paid for the number of hours tracked (i.e., 33 hours) unless Eshaan objects to TJ's time sheet within five days. The philosophy behind this is that it is difficult for service providers to request to be paid after work has been completed. The services exchange medium is able to intervene to collect the amount for TJ when Eshaan fails to approve the time sheet within five days. Put differently, Eshaan has within the five days to review and approve the time sheet, do nothing, or indicate that there is a problem. If Eshaan has a problem, then Eshaan has the responsibility to indicate the time sheet as such.

The work tracker 200 in some embodiments also allows TJ to send and receive workroom messages. The work tracker 200 in some embodiments also allows TJ to participate in instant web conferencing with other team members.

The work tracker 200 in some embodiments includes productivity information that is useful in verifying work done, such as screen shots. In some embodiments, the implementation of the work tracker 200 is build on top of Adobe® AIR™ or any existing technology that can be leveraged to minimize the complexity of the work tracker 200.

In some embodiments, all work tracker actions and functions, except for time tracking, can be done entirely within the workroom.

Terms & Milestones.

Within the workroom 600, TJ is able to view terms of the job, including new terms set between TJ and Eshaan during the job. TJ is also able to view and negotiate milestones of the job, including modified and new milestones set for the job.

My Proposal.

Within the workroom 600, TJ is able to view the original proposal submitted by him to Eshaan.

Team.

Within the workroom 600, TJ is able to view all the team members, including relevant information regarding the team members, working on the "Web/Application GUI Design" job.

As discussed above, the view of a workroom for buyers is different from the view of the workroom for service providers. In a workroom 700, a buyer, such as Eshaan, is able to view and click on additional links to Work View, Billing and Feedback. The workroom 700 advantageously allows Eshaan to manage online instead of onsite. Each of the sections will now be discussed in turn. It should be noted that the entire workroom 700 is not shown for the sake of clarity; instead, only relevant parts of the workroom 700 are shown.

Work View.

Under Work View, Eshaan is able to view all team members for the "Web/Application GUI Design" job. In addition to the work view being viewable in the workroom, the work view in some embodiments is also viewable on a work tracker.

Figure 7A:
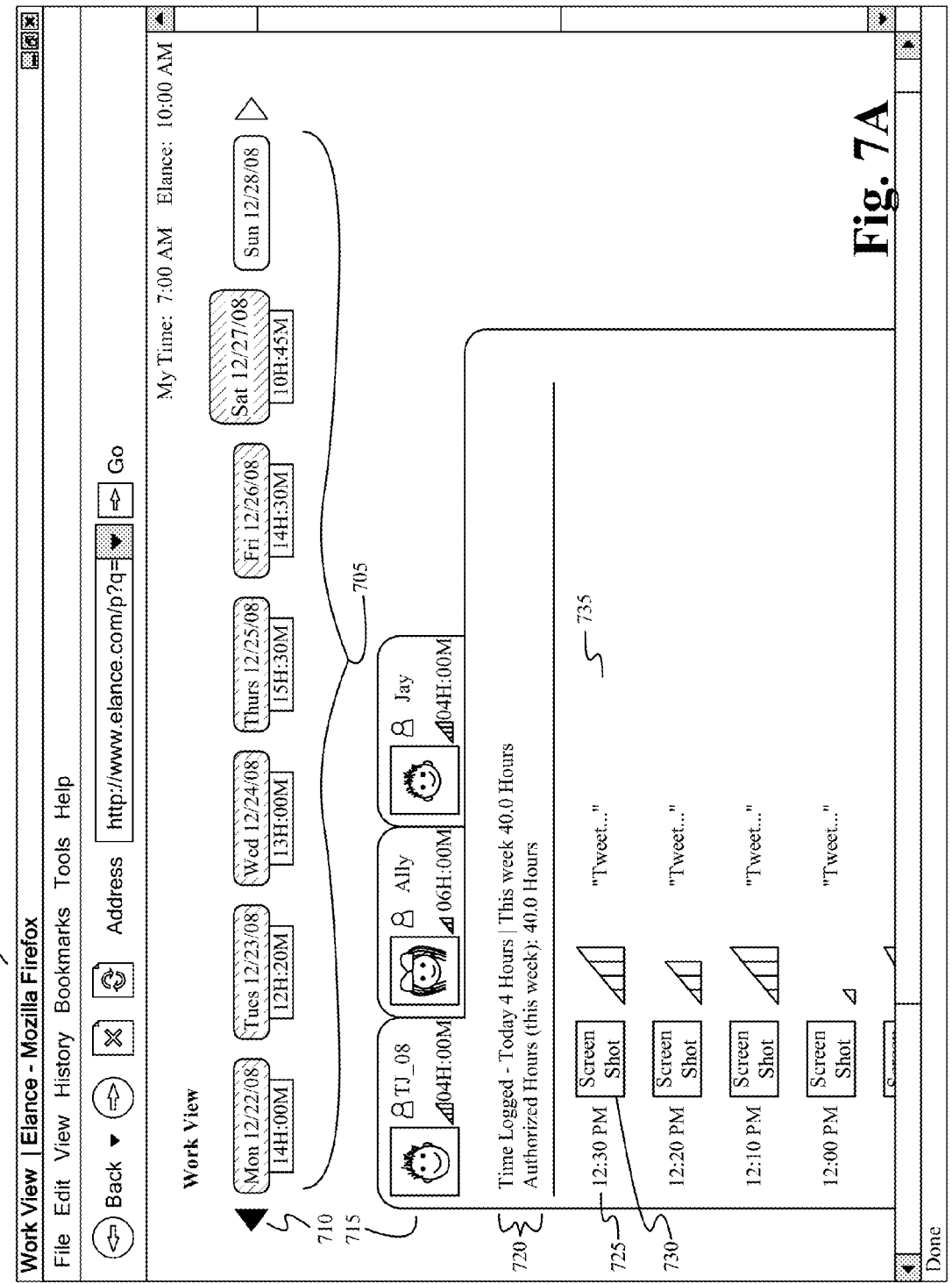
FIGS. 7A-7B illustrate exemplary views of another workroom in accordance with the present invention

FIG. 7A illustrates an exemplary view of the work view in accordance with the present invention. Assume TJ, Ally and Jay are the only team members assigned to the "Web/Application GUI Design" job. Eshaan is able to view the work for a team member by clicking on the respective service provider tab 715 (e.g., TJ_08, Ally, Jay) for any past or current day by selecting a day tab 705 (e.g., SAT Dec. 27, 2008). Assume in this example, the current day is Saturday. The SUN Dec. 28, 2008 tab is not highlighted or has a different appearance from the other tabs because SUN Dec. 28, 2008 has not yet occurred. Each of the past days and the current day is associated with a number of logged hours by all team members assigned to the job for that day. Each of the other days of the week not yet logged (i.e., SUN Dec. 28, 2008) does not have associated with it a number of hours logged. Each service provider tab 715 includes a strength bar, which indicates the service provider's activity intensity (e.g., mouse clicks/movements, keyboard activity, etc.) and the number of hours logged for the day. Eshaan is able to scroll to a different week via the forward or back arrow 710. As illustrated, Eshaan is viewing work activity for Saturday, Dec. 22, 2008. Eshaan is able to click on the back arrow to view the previous week but is not able to click on the forward arrow because events for the following week have not occurred yet.

In FIG. 7A, the work view for TJ is shown. In some embodiments, information regarding TJ's hours are shown 720, such as the number of hours logged for the day, for the week, and the number of authorized hours for the week. Times 725 for the corresponding screen shots 730 and/or tweets 735 are shown. The screen shots and tweets allow Eshaan to easily track TJ and his activity for the job throughout the day. The work view gives Eshaan an invaluable glance into TJ's work productivity for the selected day, despite the fact that TJ is working remotely.

Although only external team workers are illustrated in this example, internal team workers, if any, will also be similarly shown in the work view.

Billing.

Under Billing, Eshaan is able to select an invoice to view and thereafter pay the amount due. In some embodiments, Eshaan is able to save a soft copy of the invoice, print a hard copy of the invoice and/or forward an electronic copy of the invoice to another.

Feedback.

Leaving feedback is an important part of working on the services exchange medium. Service providers build a reputation of client satisfaction and buyers build a history of consistent hiring and payment. These serve as references for both parties when evaluating whom to work with in the future. Feedback can only be left by past clients of that service provider on services exchange medium, so a buyer, such as Eshaan, can be confident that the history of comments and ratings are from legitimate experiences of other service exchange medium members.

Figure 7B:
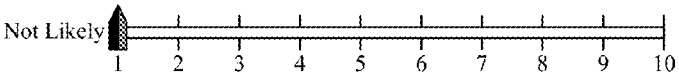

In some embodiments, feedback can be left for a service provider after a payment has been released on the job, or after the final milestone date that is specified on the job terms, whichever comes first. As illustrated in FIG. 7B, under Feedback, the name of the service provider Eshaan is leaving a feedback for is displayed. In this example, Eshaan will be leaving a feedback for TJ. In some embodiments, the feedback page comprises three sections 740, 745, 750.

The first section 740 asks the question: How likely is that you would recommend this provider to a friend or a colleague? A slider tool 740a is provided with the question and allows Eshaan to move the slide tool 740a to indicate the likelihood of recommendation. The slider tool 740a is set at a default value of, for example, 1. In some embodiments, Eshaan's response to this question will not be revealed to TJ but will only be displayed in aggregate. The aggregate in some embodiments used to rank service providers within the services exchange medium. A method of ranking service providers within the services exchange medium is described in the U.S. Pat. No. 8,700,614, issued Apr. 15, 2014, entitled "Method of and a System for Ranking Members within a Services Exchange Medium," which is incorporated by reference.

The second section 745 asks Eshaan to rate his work experience with TJ, including TJ's quality of work, responsiveness, professionalism, subject matter expertise, adherence to cost, and adherence to schedule. Each factor is associated with a slider tool 745a, which allows Eshaan is able to move the slider tool 745a to indicate his level of satisfaction. The slider tool 745a is set at a default value of, for example, 3. In some embodiments, this feedback is thereafter posted on TJ's professional profile.

The third section 750 allows Eshaan to provide comments via a text box 750a. In some embodiments, the text box 750a limits Eshaan to, for example, 2000 characters. Alternatively, the text box 750a expands when writing a long comment. In some embodiments, this feedback is thereafter posted on TJ's professional profile.

Eshaan is able to preview the feedback via the Preview button 820, submit the feedback via the Submit button 825, or cancel the feedback via the Cancel button 830. Canceling the feedback will allow Eshaan to provide feedback for TJ at some later time. However, feedback in some embodiments expires 60 days after the final milestone date so it is important to adjust the terms of the job (via Terms & Milestones link 620—FIG. 6A) if it continues past the originally agreed upon schedule. Submitting the feedback will post the feedback online. In some embodiments, feedback cannot be changed once it is posted within the services exchange medium.

My Providers.

Figure 8:
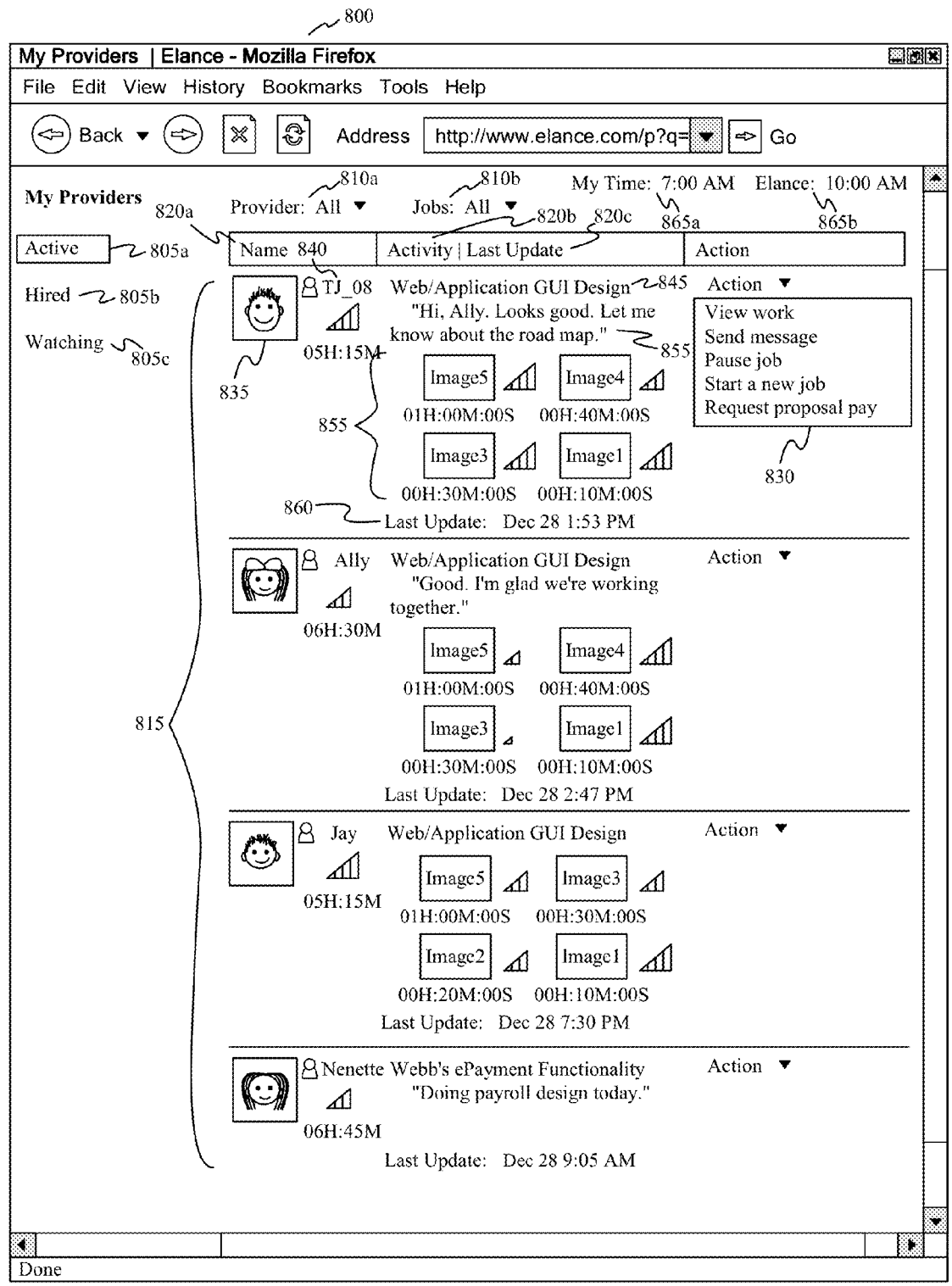
FIG. 8 illustrates an exemplary view of My Providers page in accordance with the present invention

FIG. 8 illustrates an exemplary view of My Providers page 800 in accordance with the present invention. In some embodiments, Eshaan is able to view service providers that Eshaan has hired across all jobs over time within the My Providers page 800. The My Providers page 800 is a powerful view that helps Eshaan manage online—Eshaan is able to "see" what his service providers are doing even though they are not physically in the same location as Eshaan In some embodiments, Eshaan's local time 865a, the time of the services exchange medium 865b, or both are displayed at the tope of the My Providers page 800.

In some embodiments, Eshaan is able to click on the Active link 805a to view all active service providers. Active service providers are those who are currently working on an open job for Eshaan Eshaan is further able to filter those active service providers based on the role via the Provider pull down menu 810a and/or based on the job via the Jobs pull down menu 810b. The result based on the filter or criterion is displayed in a table 815.

The table 815 typically displays the service providers in an order based on the job or the last update from the service provider. However, Eshaan is able to change the ordering based on the provider name 820a, the job 820b or the last update 820c. In FIG. 8, all service providers across all jobs are displayed in the table 815. The service providers are ordered based on the job name; the team members for "Web/Application GUI Design" are listed first, then the team members for "Webb's ePayment Functionality" are listed.

Useful information is typically shown for each service provider listed. For example, an image 835 of the service provider, the name or screen name 840 of the service provider, the name of the job 845 that the service provider is working on, the last message such as a tweet 850 from the service provider (if any), a set of screen shots 855 (if any), and the service provider's last update date/time 860 are displayed. In some embodiments, each screen shot is displayed along with the day/time the screen shot was taken. In some embodiments, the last four screen shots are displayed. Other useful information can also be included in the table 815.

Further, an Action pull-down menu 830 is associated with each service provider listed. The Action pull-down menu 830 allows Eshaan to view the work done for the job (e.g., the workroom), send a message to the service provider, pause the job the service provider is working on, start a new job with the service provider, request a proposal from the service provider, and/or pay the service provider. Other actions are possible.

In some embodiments, Eshaan is able to click on the Hired link 805b to view all the service providers that Eshaan has hired over time within the services exchange medium. In some embodiments, Eshaan is also able to click on the Watching link 805c to view preferred service providers that Eshaan may want to hire in the future.

The My Providers page 800 advantageously provides Eshaan one view across all different jobs, providing Eshaan a powerful tool to oversee all jobs that are being worked on for Eshaan from one location. Put differently, the My Providers page 800 allows Eshaan to manage his online teams from a central location.

It should be well known in the art that the above described pages are exemplary and do not limit the invention in any way. Further, the messages and layouts of the pages are not meant to be all-inclusive examples and should not be regarded as such. The pages can be viewed in a web browser, a WAP browser, or the like, of an Internet-ready device. In some embodiments, the pages are automatically refreshed to present the most up-to-date content.

Figure 9:
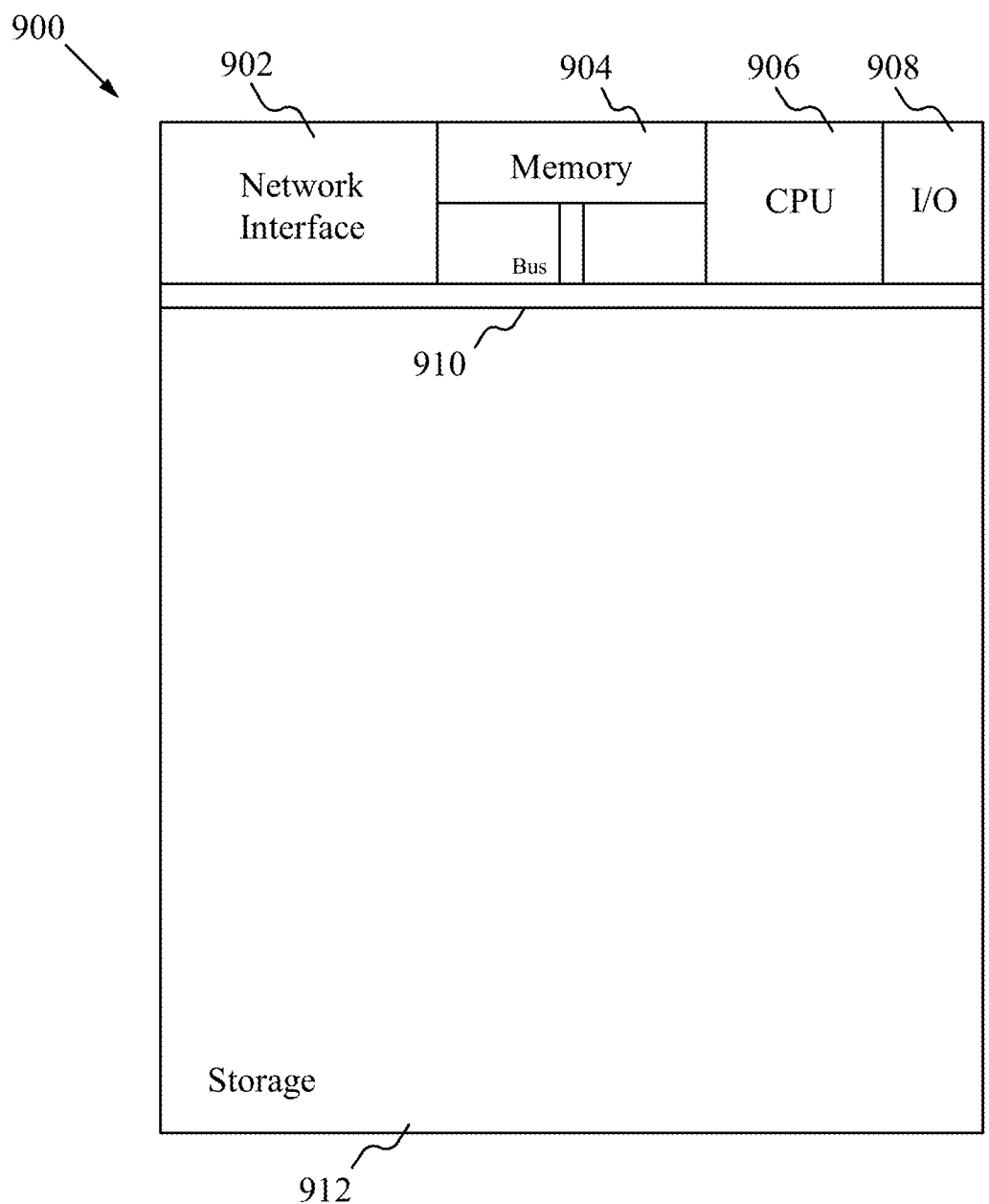
FIG. 9 illustrates a graphical representation of an exemplary computing device in accordance with the present invention

Further, it should be well known in the art that software used to create the described pages is sorted in a computing device within the services exchange medium. FIG. 9 illustrates a graphical representation of an exemplary computing device 900 in accordance with the present invention. The computing device 900, such as a server stores, serves, computes, communicates, generates and/or displays information regarding service providers, buyers, jobs, to name a few, within the services exchange medium. A service provider, such as TJ, uses an Internet-ready device, such as a personal computer, to interact with the computer device 900.

In general, a hardware structure suitable for implementing the computing device 500 includes a network interface 902, a memory 904, processor 906, I/O device(s) 908, a bus 910 and a storage device 912. The choice of processor is not critical as long as the processor 906 has sufficient speed. The memory 904 is any conventional computer memory known in the art. The storage device 912 is a hard drive, CDROM, CDRW, DVD, DVDRW, flash memory card or any other storage device. The computing device is able to include one or more network interfaces 902. An example of a network interface includes a network card connected to an Ethernet or other type of LAN. The I/O device(s) 508 are able to include one or more of the following: keyboard, mouse, monitor, display, printer, modem and other devices. Software used to create the described pages is likely to be stored in the storage device 912 and memory 904 and processed as an application is typically processed.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device.

The Overview

Figure 10:
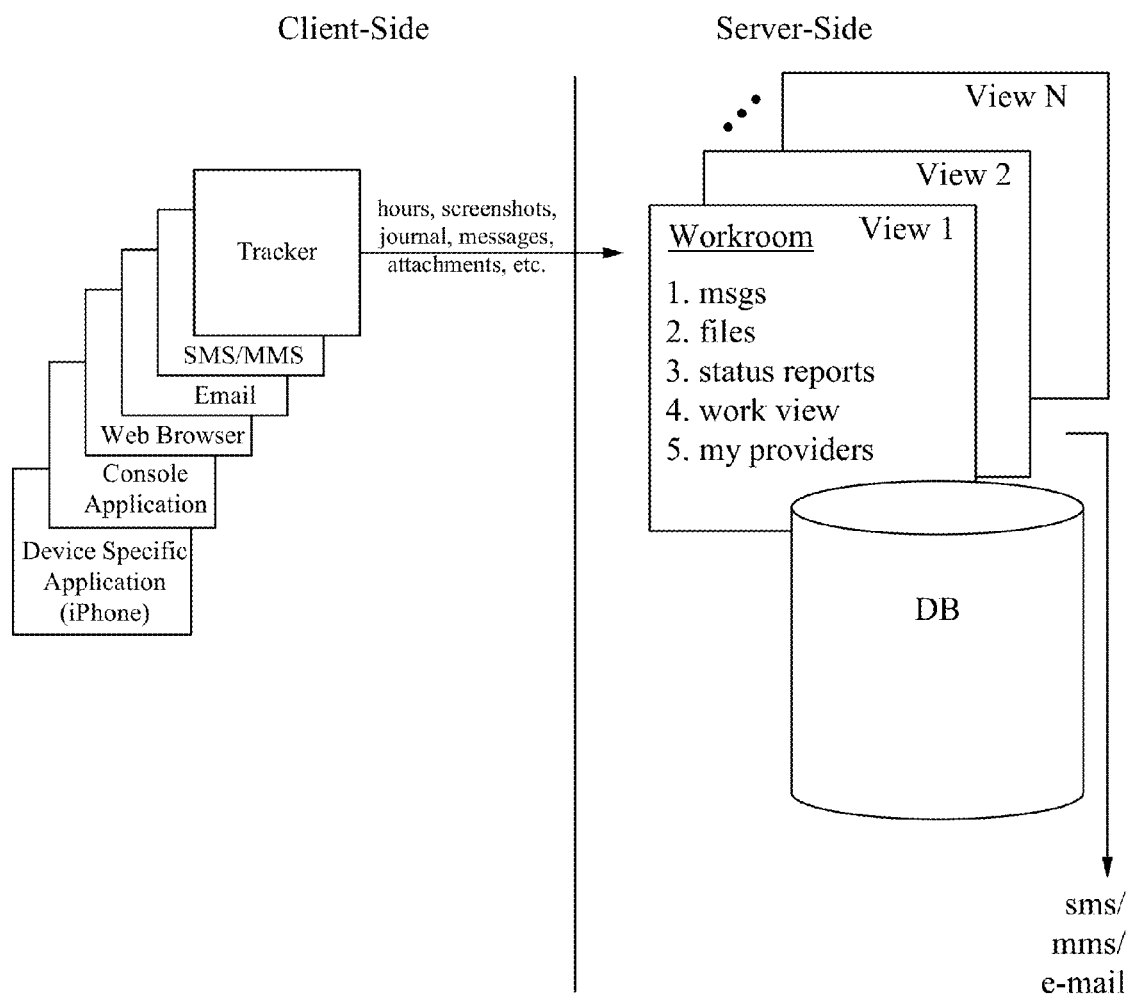
FIG. 10 illustrates a diagram showing the relationship between a work tracker and a workroom in accordance with the present invention

FIG. 10 illustrates a diagram showing the relationship between client side elements and the services exchange medium in accordance with the present invention. As discussed above, a team member can open a work tracker more than once to keep track of work done on the job. Furthermore, each team member working on the job can open their own work tracker. Information collected from the one or more work trackers are, in real time, submitted to the associated workroom. Team members are also able to send content to the workroom using email, SMS and/or MMS via the workroom email address. In some embodiments, team members can call into a workroom to leave messages; in particular, voice messages are transcribed and become part of the workroom. In fact, any communication between the client and the server then becomes part of the workroom. Typically, communication, once posted to the workroom, cannot be removed. The workroom periodically receives communication from the client and automatically stores data in one or more databases. The server sends new content posted to the workroom (e.g., messages, status reports, updates) to offline team members via email, SMS and other suitable methods. Team members of the job are able to view the workroom, which conveniently organizes and displays the data in appropriate pages. The workroom view is different depending who the viewer is. The workroom is an intuitive platform for service providers and employers to work together securely while allowing effective and efficient collaboration online.

Figure 11A:
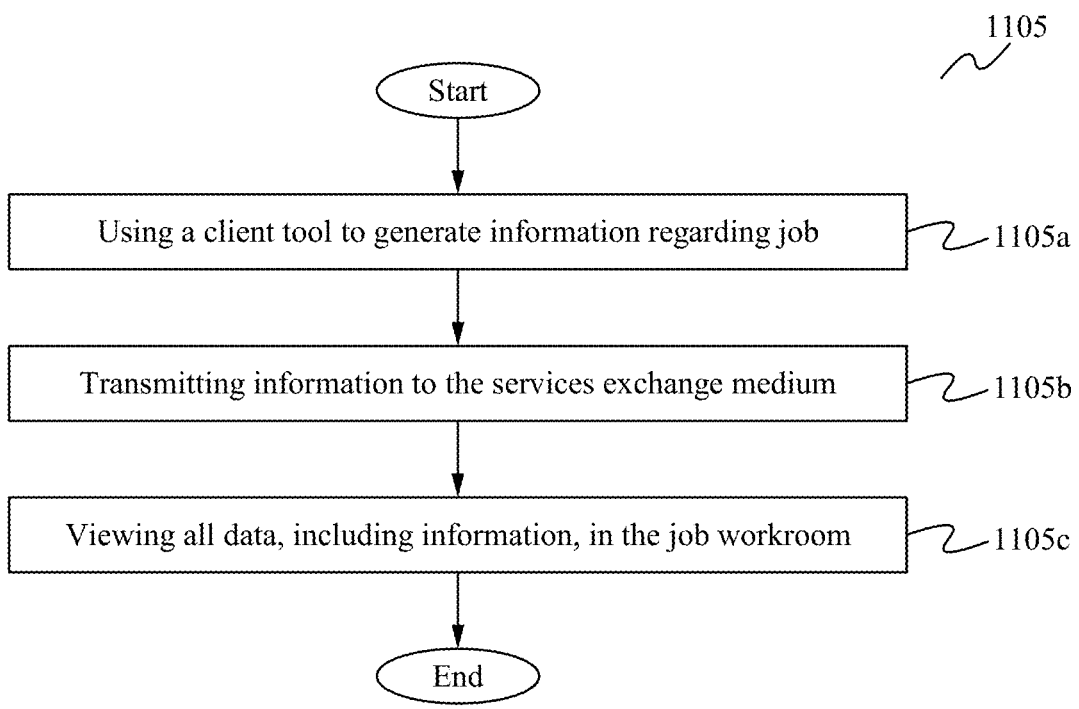
FIG. 11A illustrates an exemplary process of a client-side communication between a service provider and the services exchange medium in accordance with the present invention.

FIG. 11A illustrates an exemplary process 1105 of the client-side communication between a service provider and the services exchange medium in accordance with the present invention. At a step 1105a, the service provider generates information regarding a job via a client tool. For example, the service provider may launch a work tracker to automatically collect information such as screen shots; the work tracker typically maintains a constant connection with the services exchange medium, regardless of how the work tracker is launched. In another example, the service provider may enter the workroom to chat and/or upload files. In yet another example, the service provider may write an email, a SMS, a MMS to the job workroom. At a step 1105b, the information is transmitted to the services exchange medium. At a step 1105c, the service provider is able to view the content associated the workroom. For example, the service provider may sign into the services exchange medium and enter the workroom to view its content. As explained above, communication with the services exchange medium regarding the job are organized and displayed in the appropriate pages, such as those described above. The service provider is able to view all communication (e.g., messages, files, etc.) from each member regarding the job. In some embodiments, communication cannot be deleted from the workroom. After the step 1105c, the process 1105 ends.

Figure 11B:
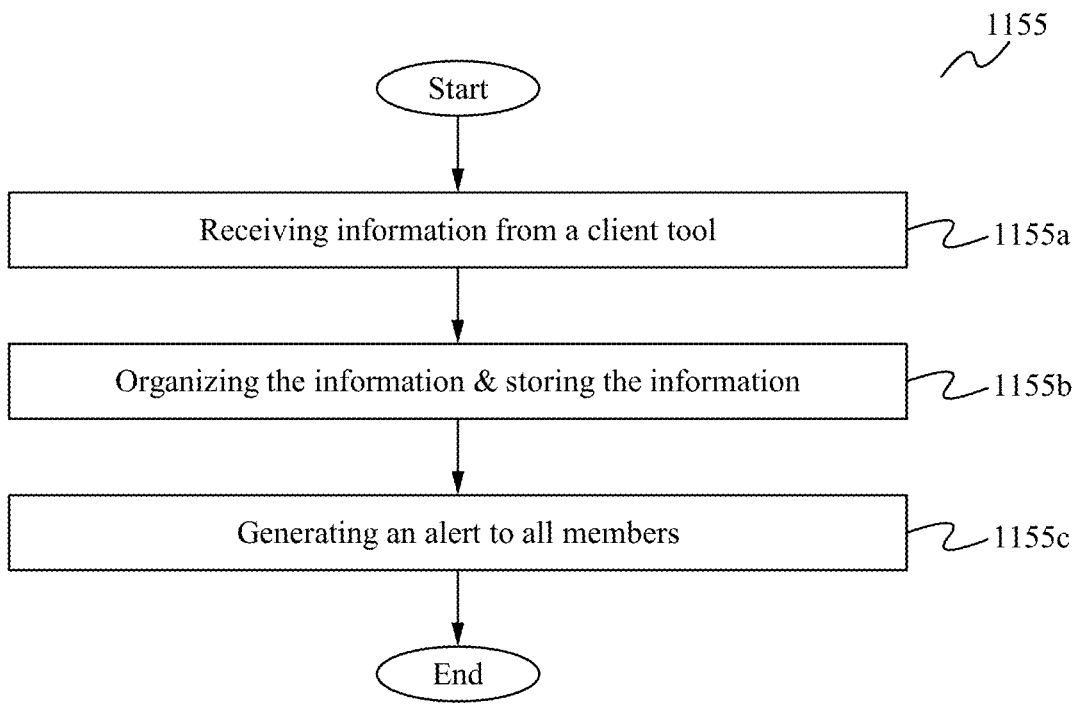
FIG. 11B illustrates an exemplary process of a server-side communication between a service provider and the services exchange medium in accordance with the present invention.

FIG. 11B illustrates an exemplary process 1155 of the server-side communication between service providers and the services exchange medium in accordance with the present invention. At a step 1155a, the services exchange medium receives information regarding a job. As explained above, a service provider may use any form of the client tool to generate information. At a step 1155b, the services exchange medium organizes and stores the received information in one or more databases. At a step 1155c, the services exchange medium generates a notification to the team members to let them know about the recent communication. The notification can be in the form of a popup message, an email, a phone call, a text or video message, or other suitable forms of notification. In some embodiments, if the service provider is currently signed into the services exchange medium, then a popup message will appear on the service provider's Internet-enabled device. If the service provider is not signed into the services exchange medium, then the service provider will receive, for example, a text message, a video message, a phone call or an email regarding the recent communication from a member. In some embodiments, the services exchange medium generates a periodic digest, such as a daily digest, which is summarization of all communications that have occurred in the workroom during a particular period of time. The digest is sent to those team members who have requested such summary be sent to them. The digest can be in the form of a popup message, an email, a phone call, a text or video message, or other suitable forms. After the step 1155c, the process 1155 ends.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions digital workroom will occur. Consequently, the claims should be broadly construed, consistent with the spirit and scope of the invention, and should not be limited to their exact, literal meaning.

We claim:

1. A computer implemented method for optimizing performance of a services exchange medium of tracking hours worked on an activity performed on a client device separate from a computing device comprising:
    providing a work tracker to track the hours worked on the activity using a work tracker, the work tracker configured to run on the client device while information compiled by the work tracker is stored within a database accessible by the computing device;
    automatically generating a status report at one or more predetermined intervals for the activity directly from multiple sessions of the work tracker running on the client device, based on a first set of information, wherein the first set of information comprises the hours worked on the activity by a service provider and one or more screen shots randomly taken when the work tracker running during the hours worked by the service provider, wherein the automatically generating a status report step also comprises validating the hours worked, and further wherein the automatically generating a status report step optimizes performance within the work tracker by simultaneously validating the hours worked by the service provider and monitoring the production and efficiency of the service provider;
    storing the first set of information in the database that is stored in a non-transitory computer-readable medium accessible by the computing device such that the first set of information is presented on the work tracker the next time the work tracker is launched on the client device; and
    generating an invoice at the computing device based on information relating to the one or more project milestones of the activity after starting the activity and before completing the activity, wherein the invoice is generated for the milestone directly from the status report based on a second set of information of the activity, after the start of the activity and before the completion of the activity.

2. The method of claim 1, wherein the first set of information is collected by the first work tracker, and the second set of information is from the at least one status report.

3. The method of claim 1, further comprising maintaining a link with the first work tracker before the automatically generating the status report.

4. The method of claim 3, wherein the link is one of an open connection or a periodic poll.

5. The method of claim 1, notifying team members associated with the job of the status report after the automatically generating the status report.

6. The method of claim 1, wherein the status report includes a back-end version for a service provider and a front-end version for a buyer, and the method further comprising, after the automatically generating the status report, allowing for manual modification of the back-end version of the status report by the service provider.

7. The method of claim 3, wherein the first work tracker is launched automatically when a service provider logs on to the services exchange medium.

8. The method of claim 3, wherein the first work tracker is manually launched when a service provider accesses a digital workroom in the services exchange medium, wherein the digital workroom is associated with the job.

9. The method of claim 1, wherein the first set of information is stored locally on the client device that the first work tracker resides on.

10. The method of claim 1, wherein the automatically generating the status report comprises transmitting the first set of information to the services exchange medium for populating the status report.

11. The method of claim 10, wherein the transmitting is in response to a service provider manually initiating a submission process.

12. The method of claim 1, wherein at least a portion of the first set of information is transmitted from the first work tracker to the services exchange medium automatically.

13. The method of claim 1, wherein at least a portion of the first set of information is transmitted from the first work tracker to the services exchange medium in real time.

14. The method of claim 1, wherein the first set of information comprises a random screen capture of what a service provider is currently working on the client device.

15. The method of claim 1, wherein the first set of information comprises comments entered by a service provider.

16. The method of claim 1, wherein the first set of information comprises one of a quantity of keyboard actions and a quantity of mouse actions in a predetermined time interval.

17. The method of claim 6, allowing the buyer from the front-end version of the status report to notify the service provider regarding a disagreement about the status report after the automatically generating the status report.

* * * * *